United States Patent
Mueller et al.

(10) Patent No.: US 7,300,192 B2
(45) Date of Patent: Nov. 27, 2007

(54) METHODS AND APPARATUS FOR ILLUMINATING ENVIRONMENTS

(75) Inventors: George G. Mueller, Boston, MA (US); Kevin J. Dowling, Westford, MA (US); Ihor A. Lys, Milton, MA (US); Charles H. Cella, Pembroke, MA (US)

(73) Assignee: Color Kinetics Incorporated, Boston, MA (US)

( * ) Notice: Subject to any disclaimer, the term of this patent is extended or adjusted under 35 U.S.C. 154(b) by 1 day.

(21) Appl. No.: 10/678,971

(22) Filed: Oct. 3, 2003

(65) Prior Publication Data

US 2004/0130909 A1 Jul. 8, 2004

Related U.S. Application Data

(63) Continuation-in-part of application No. 10/325,635, filed on Dec. 19, 2002.

(60) Provisional application No. 60/415,897, filed on Oct. 3, 2002.

(51) Int. Cl.
*F21V 7/04* (2006.01)
(52) U.S. Cl. .............. 362/555; 362/219; 362/231; 362/240; 315/209 R; 315/219
(58) Field of Classification Search ........... 315/291; 250/214, 226, 205, 238; 362/217–218, 223–225; 40/545, 547
See application file for complete search history.

(56) References Cited

U.S. PATENT DOCUMENTS

| | | | |
|---|---|---|---|
| 2,135,480 A | 11/1938 | Birdseye | |
| 2,769,897 A | 11/1956 | Rzeszutko | |
| 2,909,097 A | 10/1959 | Alden et al. | |
| 3,318,185 A | 5/1967 | Kott | |
| 3,561,719 A | 2/1971 | Grindle | |
| 3,586,936 A | 6/1971 | McLeroy | |
| 3,601,621 A | 8/1971 | Ritchie | |
| 3,643,088 A | 2/1972 | Osteen et al. | |
| 3,746,918 A | 7/1973 | Drucker et al. | |
| 3,818,216 A | 6/1974 | Larraburu | |
| 3,832,503 A | 8/1974 | Crane | |
| 3,858,086 A | 12/1974 | Anderson et al. | |
| 3,909,670 A | 9/1975 | Wakamatsu et al. | |
| 3,924,120 A | 12/1975 | Cox, III | |
| 3,958,885 A | 5/1976 | Stockinger et al. | |
| 3,974,637 A | 8/1976 | Bergey et al. | |

(Continued)

FOREIGN PATENT DOCUMENTS

CA 2 134 848 11/1998

(Continued)

OTHER PUBLICATIONS

Hewlett Packard Components, "Solid State Display and Optoelectronics Designer's Catalog," pp. 30-43, Jul. 1973.

(Continued)

*Primary Examiner*—Tho Phan
*Assistant Examiner*—Chuc Tran
(74) *Attorney, Agent, or Firm*—Wolf, Greenfield & Sacks, P.C.

(57) ABSTRACT

Provided herein are methods and systems for preparing signs and displays. The methods and systems include using a light engine for generating light of a plurality of colors to illuminate the body of a flexible conduit that receives light from the light engine. The conduit can be used as a sign, display, or similar lighting facility in many applications that traditionally used neon signs and displays.

221 Claims, 13 Drawing Sheets

U.S. PATENT DOCUMENTS

| | | | |
|---|---|---|---|
| 4,001,571 A | 1/1977 | Martin | |
| 4,054,814 A | 10/1977 | Fegley et al. | |
| 4,070,568 A | 1/1978 | Gala | |
| 4,082,395 A | 4/1978 | Donato et al. | |
| 4,096,349 A | 6/1978 | Donato | |
| 4,241,295 A | 12/1980 | Williams, Jr. | |
| 4,271,408 A | 6/1981 | Teshima et al. | |
| 4,272,689 A | 6/1981 | Crosby et al. | |
| 4,273,999 A | 6/1981 | Pierpoint | |
| 4,298,869 A | 11/1981 | Okuno | |
| 4,329,625 A | 5/1982 | Nishizawa et al. | |
| 4,339,788 A | 7/1982 | White et al. | |
| 4,367,464 A | 1/1983 | Kurahashi et al. | |
| 4,388,567 A | 6/1983 | Yamazaki et al. | |
| 4,388,589 A | 6/1983 | Molldrem, Jr. | |
| 4,392,187 A | 7/1983 | Bornhorst | |
| 4,420,711 A | 12/1983 | Takahashi et al. | |
| 4,470,044 A | 9/1984 | Bell | |
| 4,500,796 A | 2/1985 | Quin | |
| 4,597,033 A | 6/1986 | Meggs et al. | |
| 4,622,881 A | 11/1986 | Rand | |
| 4,625,152 A | 11/1986 | Nakai | |
| 4,635,052 A | 1/1987 | Aoike et al. | |
| 4,647,217 A | 3/1987 | Havel | |
| 4,654,629 A | 3/1987 | Bezos et al. | |
| 4,656,398 A | 4/1987 | Michael et al. | |
| 4,668,895 A | 5/1987 | Schneiter | |
| 4,682,079 A | 7/1987 | Sanders et al. | |
| 4,686,425 A | 8/1987 | Havel | |
| 4,687,340 A | 8/1987 | Havel | |
| 4,688,154 A | 8/1987 | Nilssen | |
| 4,688,869 A | 8/1987 | Kelly | |
| 4,695,769 A | 9/1987 | Schweickardt | |
| 4,701,669 A | 10/1987 | Head et al. | |
| 4,705,406 A | 11/1987 | Havel | |
| 4,707,141 A | 11/1987 | Havel | |
| 4,727,289 A | 2/1988 | Uchida | |
| 4,740,882 A | 4/1988 | Miller | |
| 4,753,148 A | 6/1988 | Johnson | |
| 4,771,274 A | 9/1988 | Havel | |
| 4,780,621 A | 10/1988 | Bartleucci et al. | |
| 4,818,072 A | 4/1989 | Mohebban | |
| 4,833,542 A | 5/1989 | Hara et al. | |
| 4,837,565 A | 6/1989 | White | |
| 4,843,627 A | 6/1989 | Stebbins | |
| 4,845,481 A | 7/1989 | Havel | |
| 4,845,745 A | 7/1989 | Havel | |
| 4,857,801 A | 8/1989 | Farrell | |
| 4,858,088 A | 8/1989 | Agabekov | |
| 4,863,223 A | 9/1989 | Weissenbach et al. | |
| 4,870,325 A | 9/1989 | Kazar | |
| 4,874,320 A | 10/1989 | Freed et al. | |
| 4,887,074 A | 12/1989 | Simon et al. | |
| 4,922,154 A | 5/1990 | Cacoub | |
| 4,934,852 A | 6/1990 | Havel | |
| 4,962,687 A | 10/1990 | Belliveau et al. | |
| 4,965,561 A | 10/1990 | Havel | |
| 4,973,835 A | 11/1990 | Kurosu et al. | |
| 4,979,081 A | 12/1990 | Leach et al. | |
| 4,980,806 A | 12/1990 | Taylor et al. | |
| 4,992,704 A | 2/1991 | Stinson | |
| 5,003,227 A | 3/1991 | Nilssen | |
| 5,008,595 A | 4/1991 | Kazar | |
| 5,008,788 A | 4/1991 | Palinkas | |
| 5,010,459 A | 4/1991 | Taylor et al. | |
| 5,027,262 A | 6/1991 | Freed | |
| 5,034,807 A | 7/1991 | Von Kohorn | |
| 5,036,248 A | 7/1991 | McEwan et al. | |
| 5,038,255 A | 8/1991 | Nishihashi et al. | |
| 5,057,981 A * | 10/1991 | Bowen et al. | 362/219 |
| 5,072,216 A | 12/1991 | Grange | |
| 5,078,039 A | 1/1992 | Tulk et al. | |
| 5,083,063 A | 1/1992 | Brooks | |
| 5,089,748 A | 2/1992 | Ihms | |
| 5,107,408 A | 4/1992 | Vernondier | |
| 5,126,634 A | 6/1992 | Johnson | |
| 5,128,595 A | 7/1992 | Hara | |
| 5,130,909 A | 7/1992 | Gross | |
| 5,134,387 A | 7/1992 | Smith et al. | |
| 5,142,199 A | 8/1992 | Elwell | |
| 5,154,641 A | 10/1992 | McLaughlin | |
| 5,155,669 A | 10/1992 | Yamuro | |
| 5,161,879 A | 11/1992 | McDermott | |
| 5,164,715 A | 11/1992 | Kashiwabara et al. | |
| 5,184,114 A | 2/1993 | Brown | |
| 5,194,854 A | 3/1993 | Havel | |
| 5,209,560 A | 5/1993 | Taylor et al. | |
| 5,225,765 A | 7/1993 | Callahan et al. | |
| 5,226,723 A | 7/1993 | Chen | |
| 5,254,910 A | 10/1993 | Yang | |
| 5,256,948 A | 10/1993 | Boldin et al. | |
| 5,268,828 A | 12/1993 | Miura | |
| 5,278,542 A | 1/1994 | Smith et al. | |
| 5,278,610 A | 1/1994 | Ishiwatari et al. | |
| 5,282,121 A | 1/1994 | Bornhorst et al. | |
| 5,294,865 A | 3/1994 | Haraden | |
| 5,301,090 A * | 4/1994 | Hed | 362/558 |
| 5,307,295 A | 4/1994 | Taylor et al. | |
| 5,309,541 A * | 5/1994 | Flint | 385/133 |
| 5,329,431 A | 7/1994 | Taylor et al. | |
| 5,350,977 A | 9/1994 | Hamamoto et al. | |
| 5,353,786 A * | 10/1994 | Wilk | 600/249 |
| 5,357,170 A | 10/1994 | Luchaco et al. | |
| 5,371,618 A | 12/1994 | Tai et al. | |
| 5,374,876 A | 12/1994 | Horibata et al. | |
| 5,375,043 A | 12/1994 | Tokunaga | |
| 5,388,357 A | 2/1995 | Malita | |
| 5,402,702 A | 4/1995 | Hata | |
| 5,404,282 A | 4/1995 | Klinke et al. | |
| 5,406,176 A | 4/1995 | Sugden | |
| 5,410,328 A | 4/1995 | Yoksza et al. | |
| 5,412,284 A | 5/1995 | Moore et al. | |
| 5,412,552 A | 5/1995 | Fernandes | |
| 5,418,697 A | 5/1995 | Chiou | |
| 5,420,482 A | 5/1995 | Phares | |
| 5,421,059 A | 6/1995 | Leffers, Jr. | |
| 5,432,408 A | 7/1995 | Matsuda et al. | |
| 5,436,535 A | 7/1995 | Yang | |
| 5,450,301 A | 9/1995 | Waltz et al. | |
| 5,461,188 A | 10/1995 | Drago et al. | |
| 5,463,280 A | 10/1995 | Johnson | |
| 5,465,144 A | 11/1995 | Parker et al. | |
| 5,471,052 A * | 11/1995 | Ryczek | 250/226 |
| 5,489,827 A | 2/1996 | Xia | |
| 5,491,402 A | 2/1996 | Small | |
| 5,504,395 A | 4/1996 | Johnson et al. | |
| 5,519,496 A | 5/1996 | Borgert et al. | |
| 5,545,950 A | 8/1996 | Cho | |
| 5,559,681 A * | 9/1996 | Duarte | 362/252 |
| 5,561,346 A | 10/1996 | Byrne | |
| 5,575,459 A | 11/1996 | Anderson | |
| 5,575,554 A | 11/1996 | Guritz | |
| 5,577,832 A | 11/1996 | Lodhie | |
| 5,592,051 A | 1/1997 | Korkala | |
| 5,607,227 A | 3/1997 | Yasumoto et al. | |
| 5,614,788 A | 3/1997 | Mullins et al. | |
| 5,621,282 A | 4/1997 | Haskell | |
| 5,634,711 A | 6/1997 | Kennedy et al. | |
| 5,640,061 A | 6/1997 | Bornhorst et al. | |
| 5,642,129 A | 6/1997 | Zavracky et al. | |
| 5,653,529 A | 8/1997 | Spocharski | |
| 5,655,830 A | 8/1997 | Ruskouski | |
| 5,673,059 A | 9/1997 | Zavracky et al. | |
| 5,682,035 A | 10/1997 | Gallagher et al. | |

| | | | | | | |
|---|---|---|---|---|---|---|
| 5,684,309 | A | 11/1997 | McIntosh et al. | 6,340,868 B1 | 1/2002 | Lys et al. |
| 5,688,042 | A | 11/1997 | Madadi et al. | 6,361,186 B1 | 3/2002 | Slayden |
| 5,701,058 | A | 12/1997 | Roth | 6,369,525 B1 | 4/2002 | Chang et al. |
| 5,712,650 | A | 1/1998 | Barlow | 6,371,637 B1 | 4/2002 | Atchinson et al. |
| 5,721,471 | A | 2/1998 | Begemann et al. | 6,394,623 B1 * | 5/2002 | Tsui ................... 362/249 |
| 5,734,590 | A | 3/1998 | Tebbe | 6,445,139 B1 | 9/2002 | Marshall et al. |
| 5,745,229 | A * | 4/1998 | Jung et al. ............. 356/73 | 6,448,550 B1 | 9/2002 | Nishimura |
| 5,751,118 | A | 5/1998 | Mortimer | 6,459,919 B1 | 10/2002 | Lys et al. |
| 5,752,766 | A | 5/1998 | Bailey et al. | 6,495,964 B1 | 12/2002 | Muthu et al. |
| 5,769,527 | A | 6/1998 | Taylor et al. | 6,528,954 B1 | 3/2003 | Lys et al. |
| 5,803,579 | A | 9/1998 | Turnbull et al. | 6,548,967 B1 | 4/2003 | Dowling et al. |
| 5,808,689 | A | 9/1998 | Small | 6,550,952 B1 | 4/2003 | Hulse et al. |
| 5,812,105 | A | 9/1998 | Van de Ven | 6,551,282 B1 | 4/2003 | Exline et al. |
| 5,821,695 | A | 10/1998 | Vilanilam et al. | 6,561,690 B2 | 5/2003 | Balestriero et al. |
| 5,836,676 | A | 11/1998 | Ando et al. | 6,566,824 B2 | 5/2003 | Panagotacos et al. |
| 5,848,837 | A | 12/1998 | Gustafson | 6,577,080 B2 | 6/2003 | Lys et al. |
| 5,850,126 | A | 12/1998 | Kanbar | 6,582,103 B1 | 6/2003 | Popovich et al. |
| 5,851,063 | A | 12/1998 | Doughty et al. | 6,592,238 B2 | 7/2003 | Cleaver et al. |
| 5,852,658 | A | 12/1998 | Knight et al. | 6,596,977 B2 | 7/2003 | Muthu et al. |
| 5,854,542 | A | 12/1998 | Forbes | 6,608,453 B2 | 8/2003 | Morgan et al. |
| RE36,030 | E | 1/1999 | Nadeau | 6,609,813 B1 | 8/2003 | Showers et al. |
| 5,859,508 | A | 1/1999 | Ge et al. | 6,624,597 B2 | 9/2003 | Dowling et al. |
| 5,887,968 | A | 3/1999 | Logan | 6,636,003 B2 | 10/2003 | Rahm et al. |
| 5,896,010 | A | 4/1999 | Mikolajczak et al. | 6,639,574 B2 * | 10/2003 | Scheibe .................. 345/83 |
| 5,907,742 | A | 5/1999 | Johnson et al. | 6,659,622 B2 * | 12/2003 | Katogi et al. ............. 362/219 |
| 5,912,653 | A | 6/1999 | Fitch | 6,676,284 B1 | 1/2004 | Wynne Willson |
| 5,924,784 | A | 7/1999 | Chliwnyj et al. | 6,683,423 B2 | 1/2004 | Cunningham |
| 5,927,845 | A | 7/1999 | Gustafson et al. | 6,689,999 B2 * | 2/2004 | Haines et al. ............. 250/205 |
| 5,946,209 | A | 8/1999 | Eckel et al. | 6,717,376 B2 | 4/2004 | Lys et al. |
| 5,949,581 | A | 9/1999 | Kurtenbach et al. | 6,720,745 B2 | 4/2004 | Mueller et al. |
| 5,952,680 | A | 9/1999 | Strite | 6,726,350 B1 | 4/2004 | Herold |
| 5,959,547 | A | 9/1999 | Tubel et al. | 6,749,310 B2 | 6/2004 | Pohlert |
| 5,961,201 | A | 10/1999 | Gismondi | 6,762,562 B2 | 7/2004 | Leong |
| 5,963,185 | A | 10/1999 | Havel | 6,834,395 B2 * | 12/2004 | Fuentes ................... 2/69 |
| 5,974,553 | A | 10/1999 | Gandar | 6,965,205 B2 * | 11/2005 | Piepgras et al. ............ 315/318 |
| 5,980,064 | A | 11/1999 | Metroyanis | 2001/0033488 A1 | 10/2001 | Chliwnyj et al. |
| 5,982,969 | A | 11/1999 | Sugiyama et al. | 2002/0038157 A1 | 3/2002 | Dowling et al. |
| 6,008,783 | A | 12/1999 | Kitagawa et al. | 2002/0044066 A1 | 4/2002 | Dowling et al. |
| 6,016,038 | A | 1/2000 | Mueller et al. | 2002/0047569 A1 | 4/2002 | Dowling et al. |
| 6,018,237 | A | 1/2000 | Havel | 2002/0048169 A1 | 4/2002 | Dowling et al. |
| 6,020,825 | A | 2/2000 | Chansky et al. | 2002/0057061 A1 | 5/2002 | Mueller et al. |
| 6,023,255 | A | 2/2000 | Bell | 2002/0060526 A1 | 5/2002 | Timmermans et al. |
| 6,025,550 | A | 2/2000 | Kato | 2002/0070688 A1 | 6/2002 | Dowling et al. |
| 6,031,343 | A | 2/2000 | Recknagel et al. | 2002/0074559 A1 | 6/2002 | Dowling et al. |
| 6,056,420 | A | 5/2000 | Wilson et al. | 2002/0078221 A1 | 6/2002 | Blackwell et al. |
| 6,068,383 | A | 5/2000 | Robertson et al. | 2002/0101197 A1 | 8/2002 | Lys et al. |
| 6,072,280 | A | 6/2000 | Allen | 2002/0105285 A1 * | 8/2002 | Loughrey ................... 315/291 |
| 6,074,074 | A | 6/2000 | Marcus | 2002/0114155 A1 | 8/2002 | Katogi et al. |
| 6,092,915 | A | 7/2000 | Rensch | 2002/0126064 A1 | 9/2002 | Yen |
| 6,095,661 | A | 8/2000 | Lebens et al. | 2002/0130627 A1 | 9/2002 | Dowling et al. |
| 6,097,352 | A | 8/2000 | Zavracky et al. | 2002/0145394 A1 | 10/2002 | Morgan et al. |
| 6,127,783 | A | 10/2000 | Pashley et al. | 2002/0145869 A1 | 10/2002 | Dowling |
| 6,132,072 | A | 10/2000 | Turnbull et al. | 2002/0152045 A1 | 10/2002 | Dowling et al. |
| 6,135,604 | A | 10/2000 | Lin | 2002/0153851 A1 | 10/2002 | Dowling et al. |
| 6,150,774 | A | 11/2000 | Mueller et al. | 2002/0158583 A1 | 10/2002 | Lys et al. |
| 6,158,882 | A | 12/2000 | Bischoff, Jr. | 2002/0163316 A1 | 11/2002 | Dowling et al. |
| 6,166,496 | A | 12/2000 | Lys et al. | 2002/0171365 A1 | 11/2002 | Morgan et al. |
| 6,183,086 | B1 | 2/2001 | Neubert | 2002/0171377 A1 | 11/2002 | Mueller et al. |
| 6,183,104 | B1 | 2/2001 | Ferrara | 2002/0171378 A1 | 11/2002 | Morgan et al. |
| 6,183,108 | B1 | 2/2001 | Herold | 2002/0176259 A1 | 11/2002 | Ducharme |
| 6,184,628 | B1 | 2/2001 | Ruthenberg | 2002/0195975 A1 | 12/2002 | Dowling et al. |
| 6,196,471 | B1 | 3/2001 | Ruthenberg | 2003/0011538 A1 | 1/2003 | Lys et al. |
| 6,211,626 | B1 | 4/2001 | Lys et al. | 2003/0021115 A1 | 1/2003 | Sloan et al. |
| 6,215,409 | B1 | 4/2001 | Blach | 2003/0028260 A1 | 2/2003 | Blackwell |
| 6,237,290 | B1 | 5/2001 | Tokomoto et al. | 2003/0048641 A1 | 3/2003 | Alexanderson et al. |
| 6,250,774 | B1 | 6/2001 | Begemann et al. | 2003/0057884 A1 | 3/2003 | Dowling et al. |
| 6,273,338 | B1 | 8/2001 | White | 2003/0057886 A1 | 3/2003 | Lys et al. |
| 6,283,612 | B1 | 9/2001 | Hunter | 2003/0057887 A1 | 3/2003 | Dowling et al. |
| 6,292,901 | B1 | 9/2001 | Lys et al. | 2003/0057890 A1 | 3/2003 | Lys et al. |
| 6,323,832 | B1 | 11/2001 | Nishizawa et al. | 2003/0076281 A1 | 4/2003 | Morgan et al. |
| 6,329,764 | B1 | 12/2001 | Van de Ven | 2003/0100837 A1 | 5/2003 | Lys et al. |
| 6,330,111 | B1 | 12/2001 | Myers | 2003/0107887 A1 | 6/2003 | Eberl |
| 6,331,915 | B1 | 12/2001 | Myers | 2003/0133292 A1 | 7/2003 | Mueller et al. |

| | | | |
|---|---|---|---|
| 2003/0137258 | A1 | 7/2003 | Piepgras et al. |
| 2003/0198061 | A1 | 10/2003 | Chambers et al. |
| 2003/0210222 | A1* | 11/2003 | Ogiwara et al. ............ 345/103 |
| 2003/0222587 | A1 | 12/2003 | Dowling et al. |
| 2004/0032226 | A1 | 2/2004 | Lys |
| 2004/0036006 | A1 | 2/2004 | Dowling |
| 2004/0052076 | A1 | 3/2004 | Mueller et al. |
| 2004/0066652 | A1 | 4/2004 | Hong |
| 2004/0090787 | A1 | 5/2004 | Dowling et al. |
| 2004/0105261 | A1 | 6/2004 | Ducharme et al. |
| 2004/0130909 | A1 | 7/2004 | Mueller et al. |
| 2005/0122293 | A1 | 6/2005 | Wang |

FOREIGN PATENT DOCUMENTS

| | | |
|---|---|---|
| DE | 2315709 | 10/1974 |
| DE | 205307 | 12/1983 |
| DE | 3438154 A1 | 4/1986 |
| DE | 03837313 | 5/1989 |
| DE | 03805998 | 9/1989 |
| DE | 3925767 A1 | 4/1990 |
| DE | 8902905 | 5/1990 |
| DE | 3917101 | 11/1990 |
| DE | 3916875 | 12/1990 |
| DE | 4041338 A1 | 7/1992 |
| DE | 4130576 C1 | 3/1993 |
| DE | 9414688 U1 | 2/1995 |
| DE | 9414689 | 2/1995 |
| DE | 4419006 A1 | 12/1995 |
| DE | 29607270 U1 | 8/1996 |
| DE | 19525897 | 10/1996 |
| DE | 28620583 U1 | 3/1997 |
| DE | 19651140 A1 | 6/1997 |
| DE | 19602891 A1 | 7/1997 |
| DE | 20203326 U1 | 7/2002 |
| EP | 482680 A1 | 4/1992 |
| EP | 567280 B1 | 10/1993 |
| EP | 734082 A2 | 9/1996 |
| EP | 1162400 A2 | 12/2001 |
| FR | 2 640 791 | 6/1990 |
| FR | 88 17359 | 6/1990 |
| GB | 2045098 A | 10/1980 |
| GB | 2135536 A | 8/1984 |
| GB | 2176042 A | 12/1986 |
| JP | 59-166286 | 11/1984 |
| JP | 61-44694 | 3/1986 |
| JP | 61-182590 | 11/1986 |
| JP | 63-132990 | 8/1988 |
| JP | 2247688 | 3/1990 |
| JP | 3-98483 | 10/1991 |
| JP | 06043830 | 2/1994 |
| JP | 7-129099 | 5/1995 |
| JP | 7-39120 | 7/1995 |
| JP | 8-106264 | 4/1996 |
| JP | 8-007611 | 12/1996 |
| JP | 9 320766 | 12/1997 |
| KR | 1019910009812 | 11/1991 |
| WO | WO89/05086 | 6/1989 |
| WO | WO94/18809 | 8/1994 |
| WO | WO95/13498 | 5/1995 |
| WO | WO96/41098 | 12/1996 |
| WO | WO99/06759 | 2/1999 |
| WO | WO99/30537 A1 | 6/1999 |
| WO | WO 00/14705 | 3/2000 |
| WO | WO 01/73818 A1 | 10/2001 |
| WO | WO 02/061328 A1 | 8/2002 |

OTHER PUBLICATIONS

Intec Research, TrackSpot, http://www.intec-research.com/trackspot.htm, pp. 1-4, Apr. 24, 2003.
SHARP, Optoelectronics Data Book, pp. 1096-1097, 1994/1995.
About DMX-512 Lighting Protocol—Pangolin Laser Systems, pp. 1-4, Apr. 7, 2003.
Avitec Licht Design '89-90, pp. 1-4.
Dr. Ing, Ulrich Tietze, Dr. Ing, Christoph Schenk, pp. 566-569.
Furry, Kevin and Somerville, Chuck, Affidavit, LED effects, Feb. 22, 2002, pp. 24-29.
Putman, Peter H., "The Allure of LED," www.sromagazine.biz, Jun./Jul. 2002, pp. 47-52.
Bremer, Darlene, "LED Advancements Increase Potential," www.ecmag.com, Apr. 2002, p. 115.
Longo, Linda, "LEDS Lead the Way," Home Lighting & Accessories, Jun. 2002, pp. 226-234.
"LM117/LM317A/LM317 3-Terminal Adjustable Regulator", National Semiconductor Corporation, May 1997, pp. 1-20.
"DS96177 RS-485 / RS-422 Differential Bus Repeater", National Semiconductor Corporation, Feb. 1996, pp. 1-8.
"DS2003 / DA9667 / DS2004 High Current / Voltage Darlington Drivers", National Semiconductor Corporation, Dec. 1995, pp. 1-8.
"LM140A / LM140 / LM340A / LM7800C Series 3—Terminal Positive Regulators", National Semiconductor Corporation, Jan. 1995, pp. 1-14.
Case No. 6:02-cv-270-ORL-19JGG in the United States District Court, Middle District of Florida, Orlando Division, Plaintiff's Amended Verified Complaint.
Case No. 6:02-cv-270-ORL-19JGG in the United States District Court, Middle District of Florida, Orlando Division, Defendant's Answer and Counterclaims.
Case No. 6:02-cv-270-ORL-19JGG in the United States District Court, Middle District of Florida, Orlando Division, Plaintiff's Answer to Counterclaims.
Case No. 6:02-cv-270-ORL-19JGG in the United States District Court, Middle District of Florida, Orlando Division, Plaintiff's Answer to Defendant's First Set of Interrogatories w/Exhibit 1.
Case No. 02 CV 11137MEL in the United States District Court, District of Massachusetts, Plaintiff's Complaint and Jury Demand.
Case No. 02 CV 11137MEL in the United States District Court, District of Massachusetts, Defendant's Answer and Affirmative Defenses.
High End Systems, Inc., Trackspot User Manual, Aug. 1997, Excerpts (Cover, Title page, pp. ii through iii and 2-13 through 2-14).
Artistic License, AL4000 DMX512 Processors, Revision 3.4, Jun. 2000, Excerpts (Cover, pp. 7,92 through 102).
Artistic License, Miscellaneous Drawings (3 sheets) Jan. 12, 1995.
Artistic License, Miscellaneous Documents (2 sheets Feb. 1995 and Apr. 1996).
Newnes's Dictionary of Electronics, Fourth Edition, S. W. Amos, et al., Preface to First Edition, pp. 278-279.
"http://www.luminus.cx/projects/chaser", (Nov. 13, 2000), pp. 1-16.
iLight Technologies, "Explore the iLight Possibilities", http://www.ilight-tech.com, Sep. 7, 2004, 1 page.
iLight Technologies, "Curved or straight in white or color", http://www.ilight-tech.com/products.htm, Sep. 7, 2004, 1 page.
iLight Technologies, "Curved or straight in white or color",/products_white.htm, Sep. 7, 2004, 1 page.
iLight Technologies, "Curved or straight in white or color",/products_color.htm, Sep. 7, 2004, 1 page.
iLight Technologies, "Curved or straight in white or color",/products_signs.htm, Sep. 7, 2004, 1 page.
Co-Pending U.S. Appl. No. 09/333,739, filed Jun. 15, 1999, entitled "Diffuse Illumination Systems and Methods,".
Co-Pending U.S. Appl. No. 10/245,786, filed Sep. 17, 2002, Colin Piepgras, et al., entitled "Light Emitting Diode Based Products,".
ELV Elektronik:, "Hauptkatalog 2000" 2000, ELV Elektronik, Leer XP002274205, no date available.

* cited by examiner

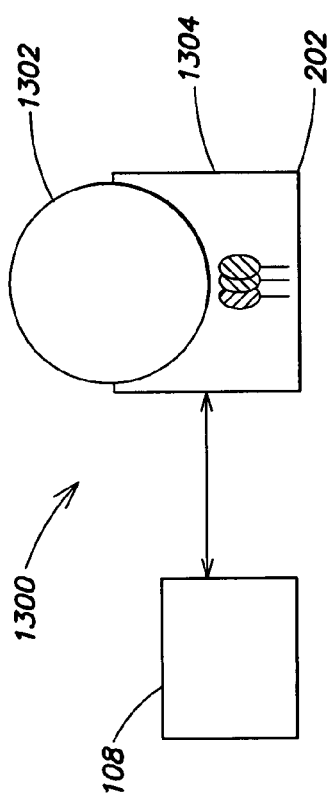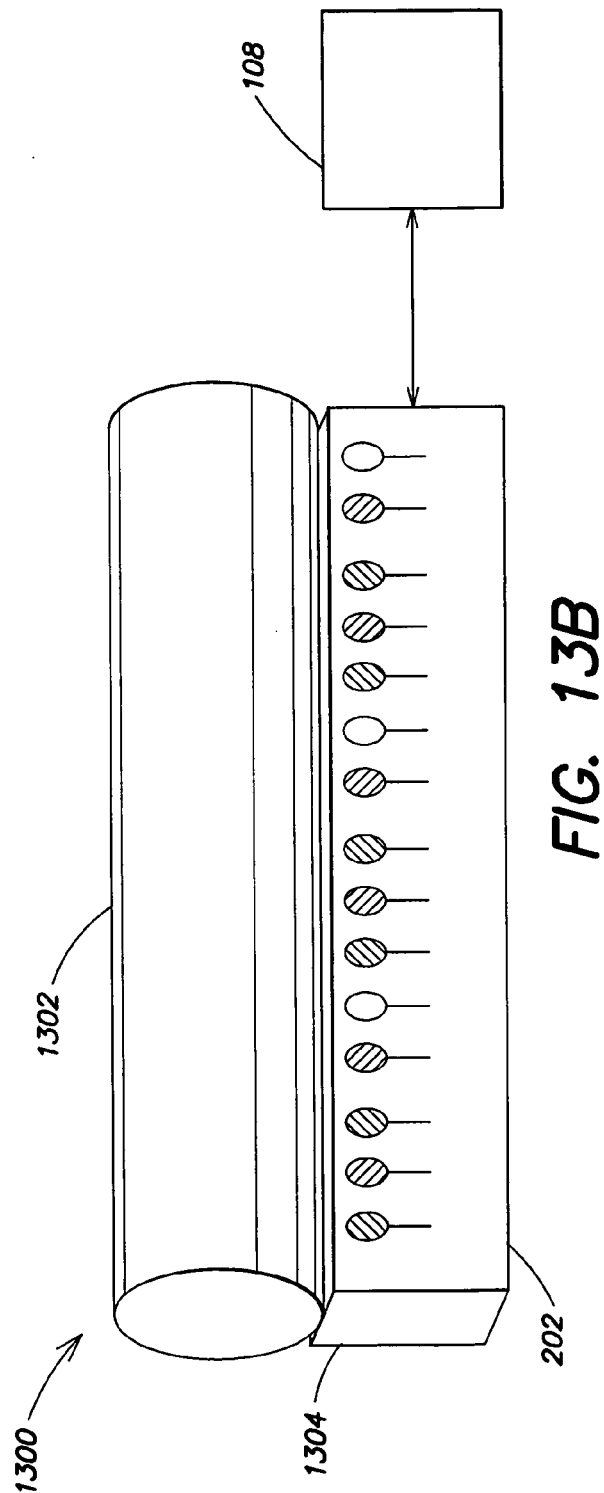

METHODS AND APPARATUS FOR ILLUMINATING ENVIRONMENTS

CROSS-REFERENCES TO RELATED APPLICATIONS

The present application claims the benefit, under 35 U.S.C. §119(e), of U.S. Provisional Application Ser. No. 60/415,897, filed Oct. 3, 2002, entitled "Methods and Apparatus for Illuminating Environments."

This application also claims the benefit, under 35 U.S.C. §120, as a continuation-in-part (CIP) of U.S. Non-provisional Application Ser. No. 10/325,635, filed Dec. 19, 2002, entitled "Controlled Lighting Methods and Apparatus."

Each of the foregoing applications is hereby incorporated herein by reference.

BACKGROUND

Recent years have seen rapid developments in the field of lighting systems. For example, traditional lighting sources such as incandescent, metal halide, neon and fluorescent sources have been joined by fiber optic lights and semiconductor-based light sources such as LEDs in wide use. LEDs, once confined to low-luminosity applications, have become much brighter, and a wider range of LED colors are now available than in the past. In addition, lighting system control has advanced, including the development of microprocessor- and network-based control systems. Color Kinetics, owner of U.S. Pat. No. 6,016,038, incorporated herein by reference, has developed many such lighting control methods and systems, including systems for mapping geometric positions of lights, systems for addressing pluralities of lights, sensor-feedback systems for lighting control, systems for authoring light shows and effects, systems for providing color temperature control, software systems for lighting control, and many others.

Certain lighting applications present particular challenges and opportunities. One such set of applications are signage and display applications, particularly those that today employ neon lights and edge-lit signs.

The neon light industry is plagued with many problems. Failure rates are very high for neon lights, as can be witnessed daily on storefronts throughout the country. Neon is difficult and expensive to transport. Neon signs typically require specialized glass blowing to support custom applications, such as lettering. As a result, neon is expensive and unreliable, and the neon sign and display industry is highly fragmented.

Edge lit signs have replaced neon for many applications. However, edge-lit signs, while very effective for some applications, offer little in the way of the customization by the end user of the sign or display.

Thus, a need exists for methods and systems that offer the customization and attractive effects of neon signs and displays, but without the many problems of neon.

SUMMARY

Provided herein are methods and systems for preparing signs and displays. The methods and systems include using a light engine for generating light of a plurality of colors to illuminate the body of a flexible conduit that receives light from the light engine. The conduit can be used as a sign, display, or similar lighting facility in many applications that traditionally used neon signs and displays.

Methods and systems are provided herein for controlling a plurality of lights using the control system to provide illumination of more than one color, wherein one available color of light is white light and another available color is non-white light. White light can be generated by a combination of red, green and blue light sources, by a white light source, or by a combination of the same. The color temperature of white light can be modified by mixing light from a second light source. The second light source can be a light source such as a white source of a different color temperature, an amber source, a green source, a red source, a yellow source, an orange source, a blue source, and a UV source. For example, lights can be LEDs of red, green, blue and white colors. More generally, the lights can be any LEDs of any color, or combination of colors, such as LEDs selected from the group consisting of red, green, blue, UV, yellow, amber, orange and white. White LEDs can include LEDs of more than one color temperature. In some cases a facility such as a phosphor can be used to alter light from an LED to a different spectral characteristic, color or color temperature.

The methods and systems disclosed herein include a kit for preparing a display. The kit may include a light engine for generating light of a plurality of colors and a substantially flexible conduit for receiving light from the light engine. The conduit can be constructed of a material suitable to allow viewing of the light generated by the light engine substantially throughout the conduit. In embodiments the light engine includes a plurality of light emitting diodes and a controller for controlling the color of light generated by the light emitting diodes.

In embodiments the kit includes a fastener for attaching the conduit in a desired configuration.

Methods and systems disclosed herein include a light system that includes a modular conduit for receiving illumination from a light, and a light engine, wherein the light engine includes a light source and a controller. In embodiments the light is controlled by a controller to produce light of a desired characteristic at each point in time. In embodiments the characteristic is selected from the group consisting of the color, intensity, saturation, and color temperature. In embodiments the controller includes an interface. In embodiments the light source includes an LED or a plurality of LEDs of different colors. In embodiments the light source includes LEDs producing different color temperatures of white light. In embodiments the light engine operates in white color mode at some times and in a non-white color mode at other times. In embodiments, the light engine produces white light by combining light from LEDs selected from the group consisting of red, green, yellow, blue, amber, white, orange and amber LEDs. In embodiments the color temperature of white light is adjusted by mixing light from an LED. In embodiments the controller is a processor.

In embodiments, the conduit receives light from the light engine. In embodiments, the conduit made of an elastic material suitable for receiving and retransmitting light. In embodiments, the conduit is a flexible conduit. In embodiments the conduit is transparent. In embodiments, the conduit is semi-opaque. In embodiments, the conduit is translucent. In embodiments, the conduit is reflective. In embodiments, the conduit is refractive. In embodiments, the conduit is a transparent elastic material, such as elastomeric vinyl acetate. In embodiments the conduit is made from a material selected from the group consisting of a polymer, polyurethane, PVC material, rubber, plastic, a metal, and an alloy. In embodiment the conduit is made from a hybrid of a plurality of materials.

In embodiments the conduit is filled with a fluid, which may be a gas, a liquid, or a vapor. In embodiments the fluid transmits light or refracts light. In embodiments the fluid contains particles that reflect or refract light.

Methods and systems disclosed herein include lighting systems, which include a light engine having a controller and a light source and an elastomeric conduit for receiving light from the light engine. In embodiments the light source is configured in a linear configuration, array, or curvilinear configuration. In embodiments, the light source is configured with groupings of LEDs, wherein each member of the grouping is an LED producing light of a different wavelength. In embodiments, the groupings triads, quadruplets, quintuplets, quintuplets or sextuplets. In embodiments the LEDs are configured to fit a lighting fixture. In embodiments the lighting fixture is configured to resemble at least one of an incandescent fixture, a halogen fixture and a fluorescent fixture.

In embodiments the lighting systems further include an interface for delivering a control signal to the controller. The interface may be a wire, a cable, a network, a bus, a circuit, or a wireless interface. The interface may be a power-cycle-based interface, a general purpose computer interface, a keyboard, a mouse, a voice- or image-recognition interface, a programming interface, a software authoring tool interface, a light show player interface, a touchpad interface, a wireless interface, an interface for a conventional lighting system, an entertainment system interface, a communications system interface, a maintenance system interface, and/or a navigation system interface.

The methods and systems may further include a surface in proximity to the light engine, wherein the conduit is attached to the surface by an attachment facility, such as a fastener, a screw, a clip and a bolt. The attachment facility may be a standoff mechanism for holding the conduit a fixed distance from the surface. The surface may be a surface of a sign. The methods and system may include a mounting facility for the conduit, which may serve as a light shield. In embodiments the mounting facility rests on a light pipe. In embodiments the light pipe collects light and delivers the light into the conduit. In embodiments the light engine is a configured to resemble a halogen lamp. In embodiments the light engine is an MR-16 fixture. In embodiments the fixture is suitable for insertion into a conventional halogen socket. In embodiments a light pipe guides light into a receiving portion of the conduit, so that the conduit glows with the color of the light from the light engine. In embodiments the light engine includes LEDs selected from red, green, blue, amber, white, orange, and UV LEDs.

In embodiments the system may include a control system for the light engine. The control system may have a user interface, a data facility, a communication facility, and/or an algorithm facility. In embodiments the communication facility may include a network. In embodiments the communication facility comprises a wireless facility. In embodiments the control system is a general purpose computer. In embodiments the control system is integrated with other system elements of the environment of the light engine. In embodiments the other system elements are selected from the group consisting of a maintenance system, an entertainment system, a sound system, a navigation system, and a security system.

In embodiments the light engine includes a processor, such as a microprocessor, a microcontroller, circuit, an application specific integrated circuit, a microchip, a chip residing on a circuit board, a chipset, a circuit board, a programmable digital signal processor, a biological circuit, a programmable gate array, a programmable array logic device, a programmable logic device, a digital signal processor, an analog-to-digital converter, and a digital-to-analog converter, discrete circuitry, passive analog components, active analog components, a resistor, a capacitor, an inductor, a transistor, an operational amplifiers, a discrete digital component, a shift register, and/or a latch.

In embodiments the system includes memory for storing program instructions for the light engine, such as a read-only memory, a programmable read-only memory, an electronically erasable programmable read-only memory, a random access memory, a dynamic random access memory, a double data rate random access memory, a Rambus direct random access memory, and/or a flash memory.

In embodiments the data facility is at least one of a general purpose computer system, a RAM, a ROM, a hard disk memory, a diskette, a zip drive, a jump drive, a database, a SQL database, a TCL database, an Oracle database, an Access database, a data facility of an entertainment system, a data facility of a maintenance system, a data facilty of a safety system and/or a combination of more than one type of data facility.

In embodiments data for the light engine resides in more than one system. In embodiments the first system is a safety system and the second system is an entertainment system. In embodiments the first system is a lighting control system and the second system is an entertainment system. In embodiments the communications facility includes at least a wire-based facility, a wireless facility, a network, an interface card, a circuit, a router, a switch, a software interface, a wire, a cable, a connector, an RF facility, an IR facility, a serial port, a parallel port, a USB facility, a firewire facility, a copper wire, a modem, a Bluetooth facility, an 802.11 facility, a DSL modems, an antenna, a satellite communications facility, and/or a telecommunications facility.

In embodiments the control system is connected to the lights by a bus that provides two-way communication between the control system and the light engines. In embodiments the light engines are addressable light engines. In embodiments the conduit comprises sub-elements that can be fitted together to form shapes. In embodiments the sub-elements are selected from the group consisting of V-shaped elements, L-shaped elements, T-shaped elements, curved elements, and straight elements. In embodiments the sub-elements are fitted together in combinations. In embodiments the sub-elements are provided in a kit with at least one light engine. In embodiments the user can shape the elements into a desired shape. In embodiments the system includes a conduit with a plurality of light engines. In embodiments the light engines are provided with a communications facility. In embodiments the light engines are configured so as to light the conduit in synchronous fashion. In embodiments the light engines change colors in concert. In embodiments the light engines create a color-chasing rainbow effect. In embodiments the light engines communicate via a flexible facility selected from the group consisting of a flexible wire, a bus, and a cable. In embodiments the wire serves as a semi-rigid element for holding the flexible conduit in a selected configuration. In embodiments a semi-rigid element is made of a material selected from the group consisting of a metal, a polymer, and a plastic. In embodiments the semi-rigid element holds shape when bent.

In embodiments the methods and systems disclosed herein include a light engine that has an optical receiver facility for receiving optical data and an optical modulator facility for modulating a portion of the emitted light, so that the light engine communicates to another light engine. In embodiments the light engine communicates using transmitted light. In embodiments the light engine communicates using a portion of the electromagnetic spectrum. In embodiments the light engine communicates ongoing data to continually update a second light engine. In embodiments the light engine sends instructions to a second light engine to execute a stored lighting program. In embodiments the instructions relate to clock data, so that various light engines can coordinate with clock time to run stored lighting programs in coordination with each other. In embodiments the conduit is configured to form a sign with lettering. In embodiments the light engines are disposed throughout the sign to generate light to illuminate at least portions of the conduit. In embodiments the sign is configured as a logo. In embodiments the sign is configured to resemble a conventional neon sign.

Methods and systems disclosed herein include lighting systems with a first element lit by color-changing illumination from a light engine having a controller and at least one LED and a second element lit by color-changing illumination from a light engine having a controller and at least one LED, wherein the first element is placed in viewing proximity to the second element to produce illumination effects that represent the combination of the two elements. In embodiments the first element is controlled to illuminate in colors that are the same as those of the second element. In embodiments the first element is controlled to illuminate in colors that are complementary to those of the second element. In embodiments the colors of the two elements are generated in complementary color pairs. In embodiments the color pairs are selected from the group consisting of a red/green pair, a blue/orange pair, and a yellow/purple pair. In embodiments the first element comprises a conduit and a second element comprises a lit background. In embodiments the lit background is edge-lit by a linear array of light engines. In embodiments the conduit is a sign, and the sign is lit in coordination with the background.

Methods and systems are disclosed herein for providing a light system, including providing a substantially linear light engine, providing a housing for the light engine, disposing a substantially cylindrical optical facility on the housing in parallel with a longitudinal axis of the housing and illuminating the optical facility by disposing the light engine at an edge of the optical facility. In embodiments the cylindrical optical facility is constructed of a translucent material.

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured to generate radiation having various bandwidths for a given spectrum (e.g., narrow bandwidth, broad bandwidth).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication and/or illumination. An "illumination source" is a light source that is particularly configured to generate radiation having a sufficient intensity to effectively illuminate an interior or exterior space.

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. The color temperature of white light generally falls within a range of from approximately 700 degrees K (generally considered the first visible to the human eye) to over 10,000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The terms "light," "lighting unit" and "lighting fixture" are used interchangeably herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

Unless otherwise indicated in a specific passage of this disclosure, the terms "processor" or "controller" are used herein interchangeably to describe various apparatus relating to the operation of one or more light sources. A processor or controller can be implemented in numerous ways, such as with dedicated hardware, using one or more microprocessors that are programmed using software (e.g., microcode) to perform the various functions discussed herein, or as a combination of dedicated hardware to perform some functions and programmed microprocessors and associated circuitry to perform other functions.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present invention, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present invention include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The following patents and patent applications are hereby incorporated herein by reference:

U.S. Pat. No. 6,016,038, issued Jan. 18, 2000, entitled "Multicolored LED Lighting Method and Apparatus;"

U.S. Pat. No. 6,211,626, issued Apr. 3, 2001 to Lys et al, entitled "Illumination Components,"

U.S. Pat. No. 6,608,453, issued Aug. 19, 2003, entitled "Methods and Apparatus for Controlling Devices in a Networked Lighting System;"

U.S. Pat. No. 6,548,967, issued Apr. 15, 2003, entitled "Universal Lighting Network Methods and Systems;"

U.S. patent application Ser. No. 09/886,958, filed Jun. 21, 2001, entitled "Method and Apparatus for Controlling a Lighting System in Response to an Audio Input;"

U.S. patent application Ser. No. 10/078,221, filed Feb. 19, 2002, entitled "Systems and Methods for Programming Illumination Devices;"

U.S. patent application Ser. No. 09/344,699, filed Jun. 25, 1999, entitled "Method for Software Driven Generation of Multiple Simultaneous High Speed Pulse Width Modulated Signals;"

U.S. patent application Ser. No. 09/805,368, filed Mar. 13, 2001, entitled "Light-Emitting Diode Based Products;"

U.S. patent application Ser. No. 09/716,819, filed Nov. 20, 2000, entitled "Systems and Methods for Generating and Modulating Illumination Conditions;"

U.S. patent application Ser. No. 09/675,419, filed Sep. 29, 2000, entitled "Systems and Methods for Calibrating Light Output by Light-Emitting Diodes;"

U.S. patent application Ser. No. 09/870,418, filed May 30, 2001, entitled "A Method and Apparatus for Authoring and Playing Back Lighting Sequences;"

U.S. patent application Ser. No. 10/045,629, filed Oct. 25, 2001, entitled "Methods and Apparatus for Controlling Illumination;"

U.S. patent application Ser. No. 10/158,579, filed May 30, 2002, entitled "Methods and Apparatus for Controlling Devices in a Networked Lighting System;"

U.S. patent application Ser. No. 10/163,085, filed Jun. 5, 2002, entitled "Systems and Methods for Controlling Programmable Lighting Systems;"

U.S. patent application Ser. No. 10/325,635, filed Dec. 19, 2002, entitled "Controlled Lighting Methods and Apparatus;" and U.S. patent application Ser. No. 10/360,594, filed Feb. 6, 2003, entitled "Controlled Lighting Methods and Apparatus."

BRIEF DESCRIPTION OF THE DRAWINGS

FIG. 13 depicts a light system with a linear light source that edge-lights a substantially linear conduit.

DETAILED DESCRIPTION

Figure 1:
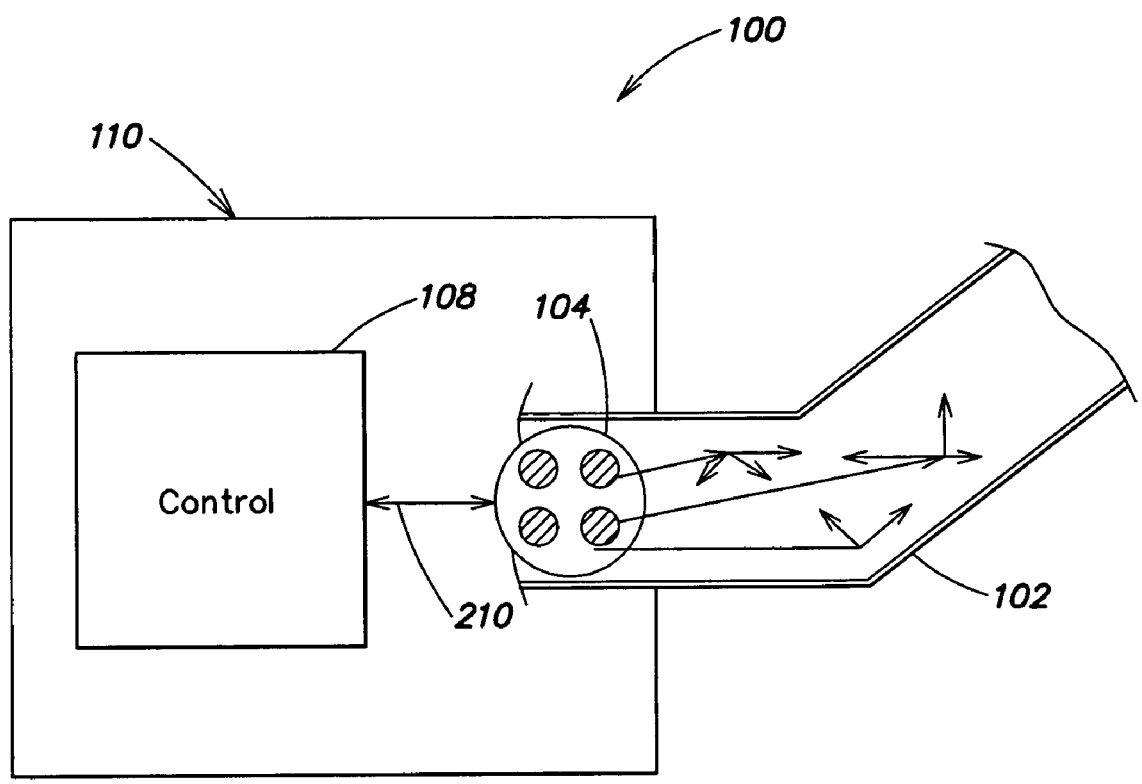
FIG. 1 depicts a light system with a modular conduit for receiving illumination from a light.

FIG. 1 depicts a light system 100 with a modular conduit 102 for receiving illumination from a light 104. The light 104 is controlled by a controller 108 to produce light of a desired color, intensity, saturation, color temperature or other characteristic at each point in time. The controller 108 and light 104 comprise a light engine 110. A light 104 coupled with a controller 108 and some kind of interface 210 (which may include a user interface) can be described as a light engine 110, light module, light system or the like. The term light engine 110 thus can describe a light under control of a controller 108, as well as other configurations for generating light. Light engines 110 can also be of greater complexity, as described in connection with FIG. 4.

In embodiments, the lights 104 are LEDs of different colors (which may include different color temperatures of white LEDs), which can, under control of the controller 108, produce light as desired. In the methods and systems disclosed herein, the lights 104 can provide illumination of colors other than white, as well as providing white illumination. Thus, a light 104 can, under processor- or computer-control, provide controlled illumination and display of light in any color, at any color temperature, at any time, as programmed by the operator of the light system.

For example, the lights 104 can operate in a white color mode at some times and in a non-white color mode at other times. In fact, the system 100 can, with the proper configuration of light sources and control elements, provide any selected color at any desired time. The methods and systems taught herein may be used in a number of environments. By using computer-controlled light sources, the operator can thus provide illumination characteristics in an environment that cannot be provided with conventional systems.

Selection of the proper light sources can be helpful to maximize the effectiveness of a computer-based lighting system in an environment. For example, environments can benefit from both white light and non-white light, such as for mood lighting, entertainment, presentation of colors for purposes of branding, and the like. Such effects may also include color temperature control, such as control based on time of day or other factors.

In embodiments it is thus desirable to include one or more white light sources, such as white LEDs of the same or different color temperature, as well as non-white sources. For example, white light can be generated by a combination of red, green (or yellow) and blue light sources, or by a white light source. The color temperature of white light can be modified by mixing light from a second light source. The second light source can be a light source such as a white source of a different color temperature, an amber source, a green source, a red source, a yellow source, an orange source, a blue source, or a UV source. In embodiments, the lights can be LEDs of red, green, blue and white colors. In other embodiments LEDs of white, amber, red, green and blue can be mixed to provide a wide range of available colors and color temperatures. More generally, the lights can be any LEDs of any color, or combination of colors, such as LEDs selected from the group consisting of red, green, blue, UV, yellow, amber, orange and white. White LEDs can include LEDs of more than one color temperature or other operating characteristic. Thus, the light systems preferably comprise light sources of different colors, so that colors other than white, and different color temperatures of white, can be produced on demand.

The controller 108 can be any control system, as more particularly described below, such as a microprocessor, microcontroller, or the like. More complex control systems can be used to provide the functions of the controller 108, as described in connection with FIG. 4 below.

The conduit 102 receives light from the light engine 110, such as white or colored light, or light that changes characteristics. The conduit 102 can be made of any material suitable for receiving light, such as any elastic material. The conduit 102 can be transparent, semi-opaque, translucent, reflective, or have other light transmitting, refracting, diffracting, or reflecting characteristics. In embodiments the conduit 102 is made of a translucent or transparent elastic material, such as elastomeric vinyl acetate (EVA). The conduit 102 could be made of a polymer, polyurethane, PVC material, rubber, plastic, a metal, an alloy, or other material capable of being bent and capable of receiving light. It could be a hybrid of any of the foregoing, such as a flexible tube that is part metal and part clear or translucent elastic material, such as EVA. The conduit 102 can be filled with a fluid, liquid, gas, or similar matter suitable for reflecting, transmitting, or refracting light.

The conduit 102 can thus be shaped into any shape, and can receive light from the light engine 110.

Figure 2:
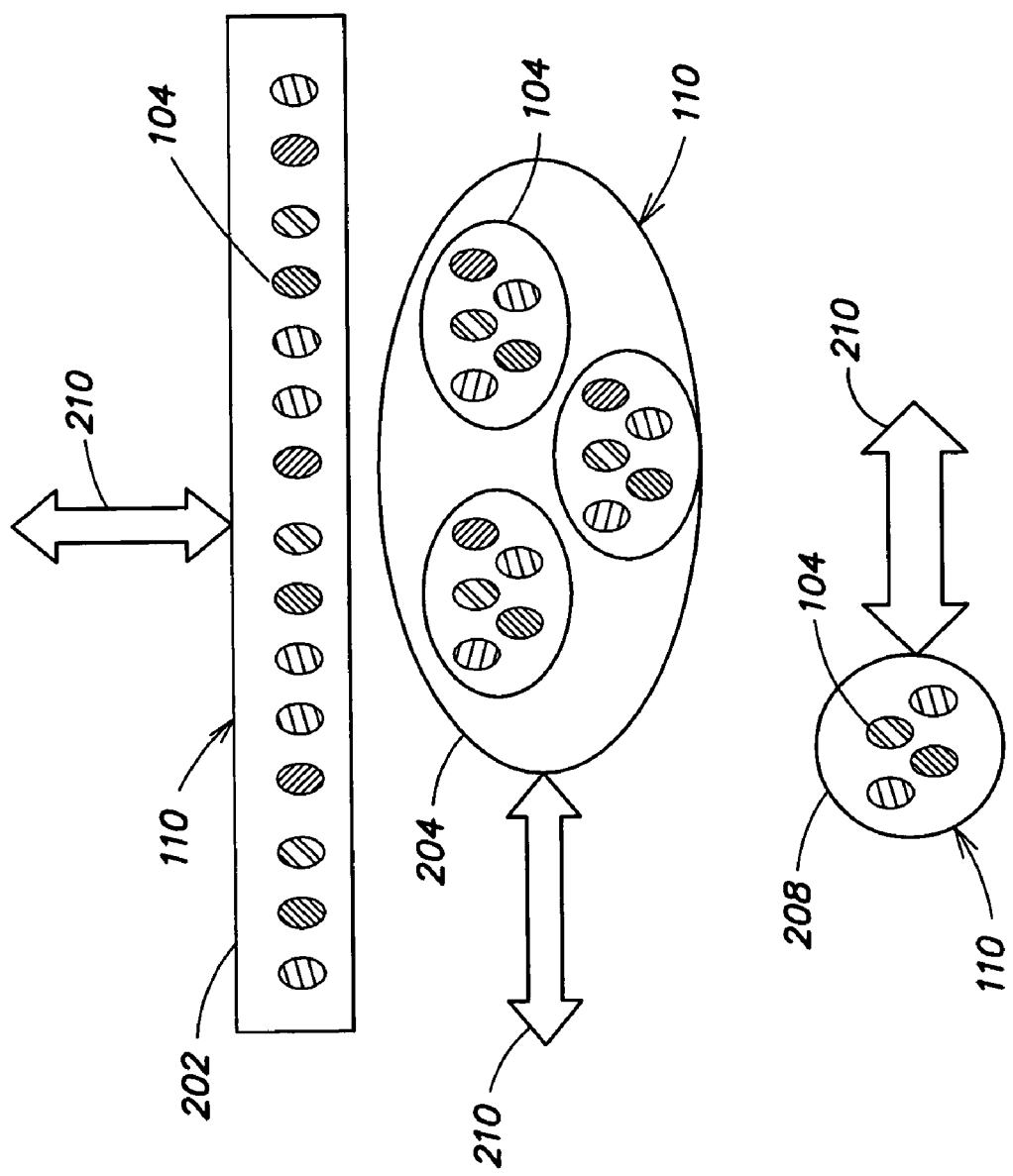
FIG. 2 depicts various configurations of lights suitable for generating light in accordance with the present invention.

FIG. 2 depicts various configurations of lights suitable for generating light in accordance with the present invention. Light engines 110 can include lights 104 of many configurations, in an unlimited number of shapes and sizes. Examples include linear arrays 202, with LEDs of different colors in a line (including curvilinear arrays), as well as groupings 204 of LEDs in triads, quadruple groups, quintuple groups, etc. LEDs can be disposed in round fixtures 208, or in various otherwise shaped fixtures, including those that match fixture shapes for incandescent, halogen, fluorescent, or other fixtures. Due to small size and favorable thermal characteristics, LED-based light sources offer flexibility in fixture geometry. In each case, the lights can have an interface 210, such as a wire, cable, network, bus, circuit, wireless interface or other interface, such as to a controller 108.

Figure 3A:
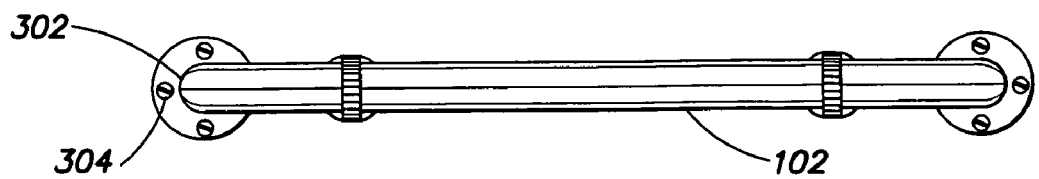
FIG. 3 depicts embodiments of light systems using an elastomeric light conduit.
Figure 3B:
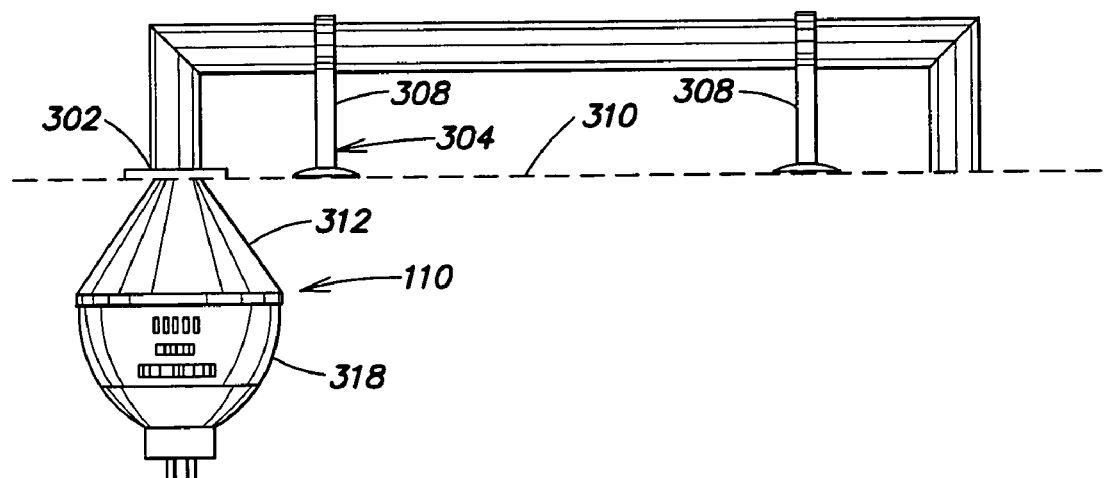
Figure 3C:
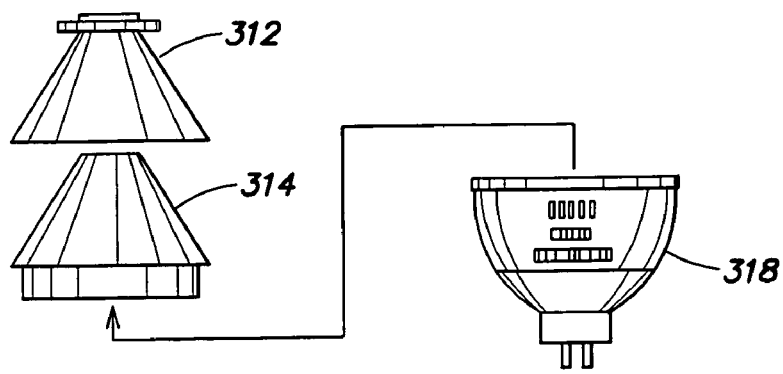

FIG. 3 depicts embodiments of light systems using an elastomeric light conduit 102. The conduit 102 may have an end portion 302 configured to receive a light engine 110. The conduit 102 may be made capable of being attached to a surface by an attachment facility 304, such as a fastener, screw, bolt or the like. The attachment facility 304 could also be a standoff mechanism 308 for holding the conduit 102 a fixed distance from a base 310, such as the base of a sign.

In embodiments, the light engine 110 may include an optional mounting facility 312, which may also serve as a light shield. The mounting facility 312 may rest on an optional light pipe 314 or collector, which may be a suitable known facility for collecting light and delivering it into the conduit 102. In embodiments, the light engine 110 may consist of a light fixture with lights and a controller, such as a CK MR-16 fixture 318 from Color Kinetics, a fixture that is suitable for insertion into a conventional halogen socket.

The light from the fixture 318 is guided by the light pipe 314 into the receiving end portion 302 of the conduit 102, resulting in illumination of the conduit 102. Thus, the conduit 102 glows with the color of the light from the fixture 318, which is selected by any user interface (described below).

Figure 4:
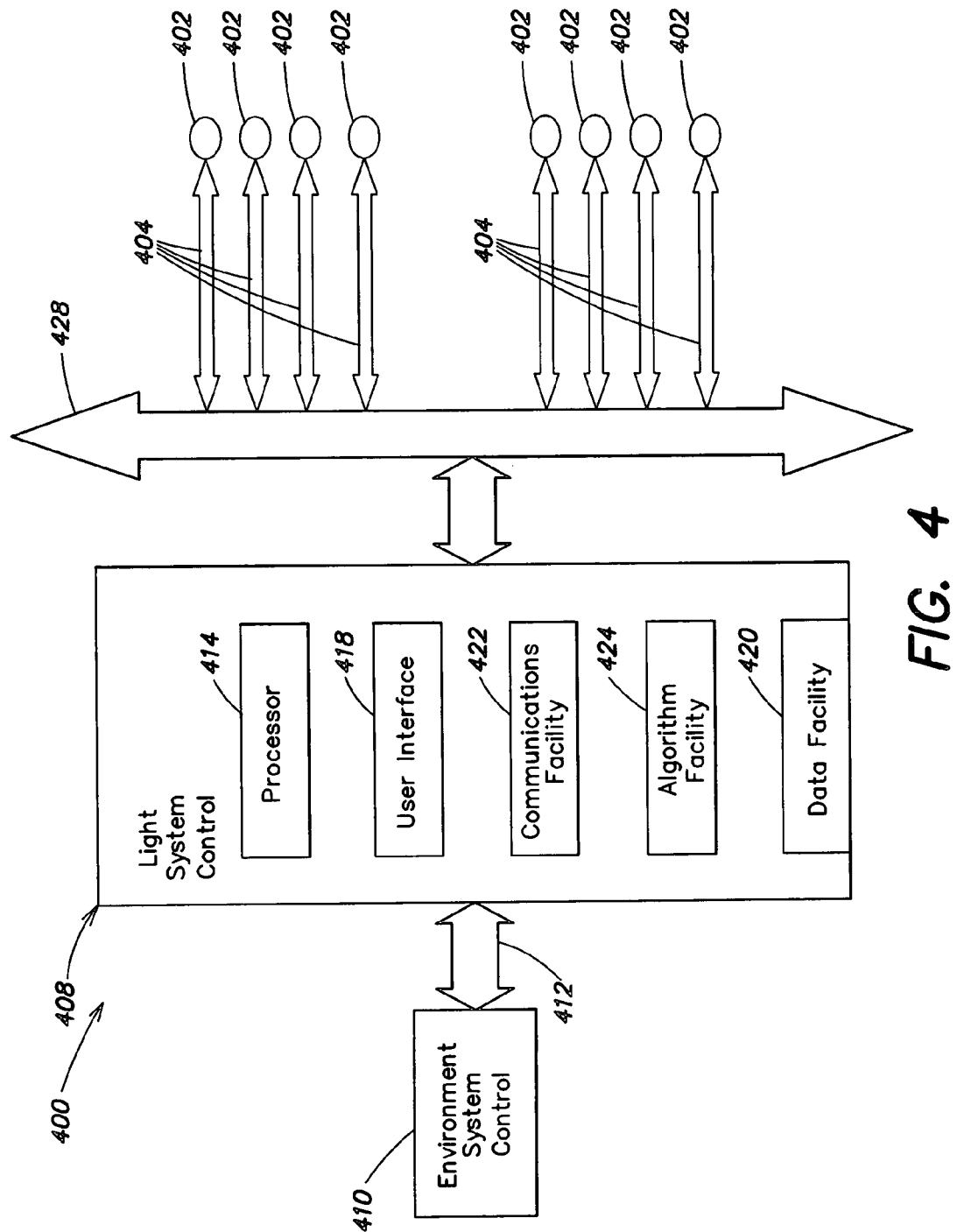
FIG. 4 depicts a system for controlling lights.

Referring to FIG. 4, the light engine 110 of FIG. 1 can consist of a very simple system with a microprocessor and a group of lights 104, or it can consist of a more complex system. FIG. 4 depicts a more generalized system for controlling lights with a much wider range of optional system elements. Such a system, or a portion thereof, should be understood to be encompassed by the light engines 110 mentioned throughout.

Referring to FIG. 4, a schematic diagram 400 depicts high-level system elements for a computer-controlled lighting system. These include a plurality of lights 402, which may include light sources such as those described in connection with FIGS. 1 and 2 above, such as LED-based lights or light fixtures, such as red, green, blue, amber, white, orange, UV, or other LEDs, disposed in any configuration. The lights 402 may be under the control of a control system 408. The control system 408 may include various system elements, such as a processor 414, as well as other control system elements, such as a user interface 418, a data facility 420, a communications facility 422 and an algorithm facility 424. It should be understood that these elements, while provided in many preferred embodiments, are optional in other embodiments. Also, it should be understood that FIG. 4 is a functional diagram, and that the control system 408, while presented as a single, integrated system, such as a self-contained light engine 110, could comprise disparate system elements, including elements residing in other locations or on other devices. For example, the data facility 420 might comprise memory resident on a general purpose computer with the processor 414, but it might also comprise a database located entirely outside the system, such as a control system for a building.

In one preferred embodiment the control system 408 is a general purpose computer, such as a PC, laptop computer or handheld computer.

The processor 414 may be any processor, such as PIC processor offered by Microchip Corp., a general purpose computer processor, such as a Pentium-based processor, or other processor or processing element. In embodiments the control system may be integrated with other system elements of the environment, so that lighting control for the lights 402 is provided on the processor of another system of the environment, such as a maintenance system, entertainment system, sound system, navigation system, security system, or the like.

In embodiments, the processor 414 may refer to any system for processing electrical, analog or digital signals. A processor may include a microprocessor, microcontroller, circuit, application specific integrated circuit, chip, chipset, programmable digital signal processor, biological circuit or other programmable device, along with memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. A processor may also, or instead, include an application specific integrated circuit, a programmable gate array, programmable array logic, a programmable logic device, a digital signal processor, an analog-to-digital converter, a digital-to-analog converter, or any other device that may be configured to process signals. In addition, a processor may include discrete circuitry such as passive or active analog components including resistors, capacitors, inductors, transistors, operational amplifiers, and so forth, as well as discrete digital components such as logic components, shift registers, latches, or any other separately packaged chip or other component for realizing a digital function. Any combination of the above circuits and components, whether packaged discretely, as a chip, as a chipset, or as a die, may be suitably adapted to use as a processor as described herein. It will further be appreciated that the term processor may apply to an integrated system, such as a personal computer, network server, or other system that may operate autonomously or in response to commands to process electronic signals such as those described herein. Where a processor includes a programmable device such as the microprocessor or microcontroller mentioned above, the processor may further include computer-executable code that controls operation of the programmable device.

The user interface 418 may be any user interface suitable for allowing an operator to control a light system, such as a power-cycle-based interface, a general purpose computer interface, a keyboard, a mouse, a voice- or image-recognition interface, a programming interface, a software authoring tool interface, a light show player interface, a touchpad interface, a wireless interface, or other interface suitable for entering computer control commands. In embodiments the interface may be an interface for another system of the environment, such as the interface to a conventional lighting system, an entertainment system interface, a communications system interface, a maintenance system interface, a navigation system interface, or other interface.

The data facility 420 is an optional system element. The data facility could be memory resident on a general purpose computer system 408, including RAM, ROM, hard disk memory, diskette, zip drive, or the like, or it could comprise a database, such as a SQL, TCL, Oracle, Access, or other database. It could comprise a data facility of another computer system, such as an entertainment system, maintenance system, safety system, or the like. In embodiments, it could comprise some or all of the above. Thus, data for lighting control could reside both in the safety system (to store safety-related lighting signals) and the entertainment system (to provide control signals for light shows) and in the general lighting system control (for general illumination). Stored control signals allow a user to program the lighting system to produce any desired effect or any color, intensity and color temperature, at any predetermined time, on demand, at random, or other various other modes. For example, the data facility 420 can store signals to create a color-chasing rainbow up and down a linear array of lights, or a series of networked lights, or to provide desirable color temperatures.

The data facility 420 can store signals that are complementary to the main lights, such as those related to lighting control of other elements, such as background display elements. The effects can include branding-related effects, such as those that use the signature colors of the operator of the system 100. The data facility 420 can include stored shows, such as those preprogrammed by an author and downloaded to the system, such as by the communications facility 422.

Many lighting effects may be generated through a system according to the principles of the present invention. The references incorporated by reference herein provide many examples of such lighting effects.

In embodiments the control system 408 may include a communications facility 422, which may facility communications either between light engines 110, between a light 104 and controller 108 or with other computer systems. The communications facility 422 may generally include any known communications facility, such as wire- and wireless-based communications facilities, networks, interface cards, circuits, routers, switches, software interfaces, wires, cables, connectors, circuits, RF, IR, serial and parallel ports, USB facilities, firewire facilities, copper wires, modems, Bluetooth facilities, various DSL modems, antennae, satellite communications facilities, telecommunications or other communications facilities.

In one preferred embodiment the communication facility 422 is that of a general purpose computer, and the control system 408 is connected to the lights 402 by a bus 428 or similar facility, as well as a physical connector 404, which together with the bus 428 provides two-way communication between the control system 408 and the lights 402. In one preferred embodiment each connector 404 or certain connectors 404 are addressable, as more particularly described below. In embodiments the bus may be a RS 485 bus or similar facility.

In some embodiments the control system 408 may also include an interface 412 to another system 410 of the environment, such as the safety system, alarm system, maintenance system, entertainment system, navigation system, power system, engine system, or the like. Via the communications facility 422 the control system 408 is capable of two-way data communications with any other computer system that is configured to communicate with the control system 408.

The control system 408 may further include the algorithm facility 424, which is a general description of any of a group of available facilities for processing instructions and, for example, providing lighting control based on the instructions. For example, in embodiments where the control system 408 receives data from the light systems 402, the control system 408 could determine that a light 402 is about to fail (such as because the total "on" time for the light as calculated by the algorithm facility 424 is nearing the predicted lifetime of the light), and it could signal the maintenance system to have the light replaced. The algorithm facility 424 can thus operate on instructions received by the communications facility 422, data from the data facility 420, and preprogrammed instructions, to generate control signals, messages, and other output in any manner desired by the user. For example, it can prioritize various lighting control signals based on various data, such as a hierarchy of systems or conditions that determine which control signal should actually be sent to the lights 402. Thus, an alarm signal would preempt an entertainment signal, and so on.

In general, it can be desirable to have addressability of light systems that are disposed in environments. By linking network addresses to physical locations, a light system operator can create light shows that are more effective than those that are created with random color effects, or ones in which the various lights systems are not well-coordinated. For example, a color-chasing rainbow effect can be easily programmed if the positions of the lights 402 are known, as well as their network addresses. Also, knowing individual addresses of lights 402 allows an operator to tailor light conditions to particular light. With addresses, it is possible to provide individual control of lights 402, rather than just general illumination of the entire environment.

On the control side, methods and systems are known for sending addressed light signals via a communications facility 422. Examples include the DMX protocol, and there are various other network protocols that can be used to address control signals to particular addresses in a network topology. In such systems, devices that have a given address extract control bits that relate to that address, so that a single control signal (comprised of signals for each of a range of addresses) effectively provides unique control signals for each of the addresses. Each light 402 thus "knows" its address and recognizes control signals that are addressed to it, while ignoring control signals that addressed to other lights 402.

A variety of methods and systems are known for setting addresses of light systems, such as the lights 402. Examples include dipswitches that are onboard the lights, various software interfaces, and the like. Methods and systems are also known for determining light locations, so that an array of lights with addresses can be stored in a table that relates the addresses to physical locations. Various addressing techniques are discussed in detail in one or more of the U.S. patents or patent applications mentioned earlier herein.

One problem with conventional facilities for addressing light systems is that in some environments lights are used heavily and thus may be changed regularly. If the address system is onboard the light, it may be difficult to know or find out the address of the replacement light. Thus, getting a replacement light to work properly may require knowing the right address for a particular position and setting that address properly upon light replacement. Setting a dipswitch on a light, while feasible, might require a maintenance person to look up the address of the light in a lookup table, set the light to the right dipswitch positions, and then plug in the light. This could be time consuming and error prone.

One solution to this problem is a preferred embodiment of the methods and systems disclosed herein. Referring to FIG. 3, in such a method and system the address facility is provided at the end of the conduit 302 that is proximate to the light engine 110, rather than on the lights 104 themselves. Thus, the conduit 102, which remains fixed in its initial position, often for the lifetime of the light system, can be associated with an address in a lookup table, allowing the author of an effect to direct control signals to the location of the connector. Thus, a light engine 110, designed to fit with the conduit 102, can receive control signals that are addressed to it, based on the facility of the conduit 102 to extract from the general control signal (such as of a bus or similar communications facility) the particular control data that is addressed to that particular connector (and in turn to any light system that is connected to that connector). With the address facility in the conduit 102, rather than the light engine 110, maintenance can consist only of plugging and unplugging any arbitrary light fixture that has the capability of responding to the control signal, without needing to take additional steps to address that fixture at the time it is put in place.

Systems and methods according to the principles of the present invention may be modular or have modular components. At least some of the U.S. patents and patent applications referenced earlier herein provide examples of such modular systems and components.

In embodiments, the conduit 102 provides a two-way data interface between the light engine 110 and a controller 108, such as the control system 408. In embodiments, the control system 408 can communicate data with the light engines 110 or lights 402, such as control data, temperature data, performance data, performance history data, light histogram data, intensity data, color temperature data, on-off status data, color data, time data, total-on-time data, light show data, lighting effect data, alarm data, maintenance data, power-usage data, system status data, customer-entered data, advertising data, branding data, communications data.

In one embodiment the control system 408 may interface with a backup power system, which provides power to the light engines 110, but which may also signal the lights to operate in a certain mode, such as an emergency mode.

In embodiments, the light systems may work in connection with a secondary system for operating on the light output of the light system, such as an optic, a phosphor, a lens, a filter, fresnel lens, a mirror, and a reflective coating.

Using the two-way communication facility of the conduit 102, the control system 408 can control the light engines 110 in response to a wide range of inputs, whether programmed by the user, provided by other computer systems 412, provided from sensors, or provided from the light engines 110.

Figure 5:
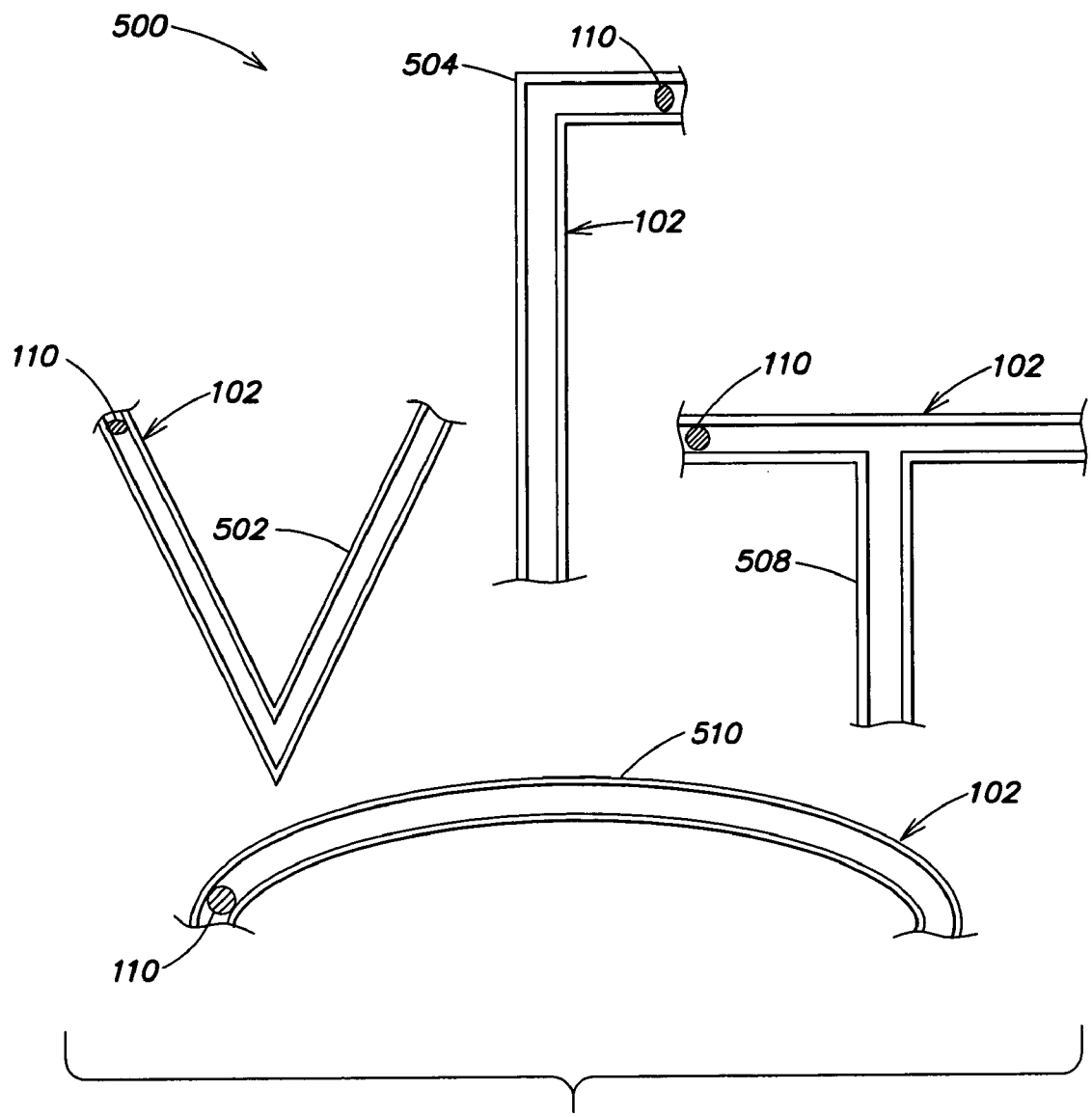
FIG. 5 depicts various configurations of elements that comprise conduits in embodiments of the invention.

FIG. 5 depicts various configurations of elements that comprise conduits 102 in embodiments of the invention. In particular a conduit 102 can consist of sub-elements 500, which can be fitted together to form different shapes. Sub-elements 500 can include V-shaped elements 502, L-shaped elements 504, T-shaped elements 508, curved elements 510, straight elements, or other more complex configurations, including ones made up of all possible combinations of the above. In each case a light engine 110, whether simple system such as in FIG. 1 or a more complex system such as described in connection with FIG. 4, can light the element 500 of the conduit 102 in a color selected by an operator of the system. The various elements 500 can be included in a kit that is provided to a user to allow the user to shape the elements 500 into a desired overall shape, such as for a sign.

Figure 6:
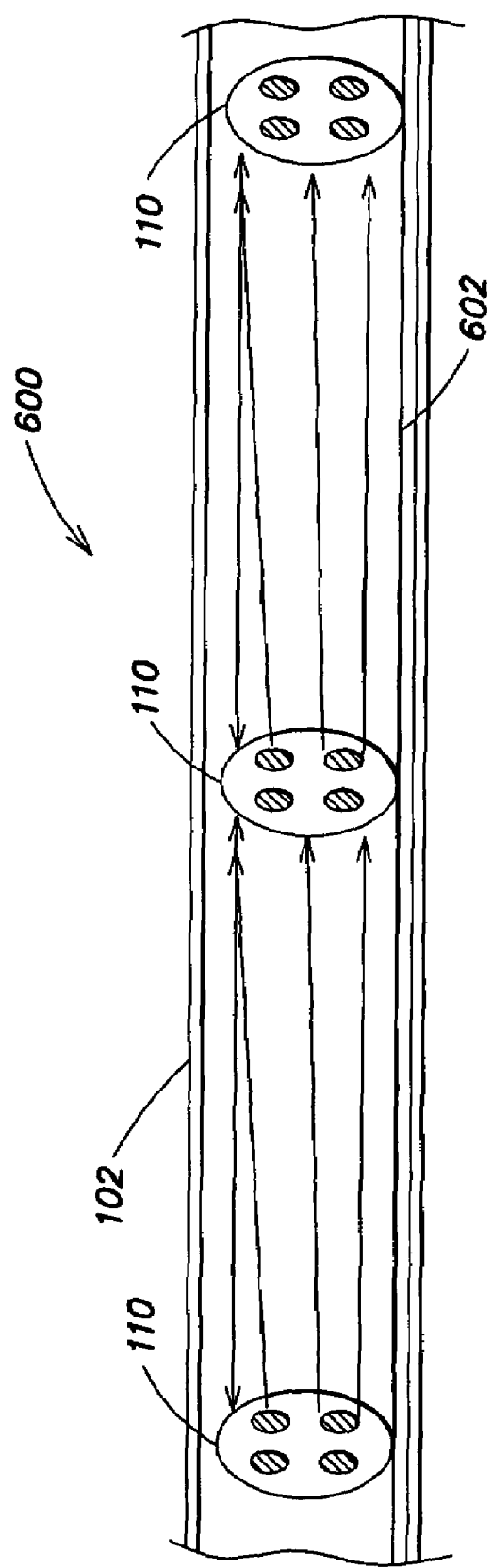
FIG. 6 depicts light engine elements disposed in a conduit.

Referring to FIG. 6, a system 600 consists of a conduit 102 with multiple light engines 110. The light engines 110 can be provided with a communications facility, so that they can receive control signals to provide illumination as desired. The light engines 110 can be configured so as to light the conduit 102 in synchronous fashion or to change colors in concert, such as to create a color-chasing rainbow effect. The light engines 110 can communicate among each other using various protocols, such as pulling addressed data from a flexible wire 602, bus, cable or similar facility, or by communicating directly with each other, such as through a transceiver facility in each light engine 110. The wire 602 may provide power or data, or it may simply serve as a semi-rigid element for holding the flexible conduit 102 in a selected configuration. Thus, it may be desirable to include a semi-rigid element 602 in a kit for allowing the user to make a sign or similar display made up of conduit elements 500 in any given shape. The semi-rigid element may be metal, plastic or other bendable element, preferably one that can hold shape to some degree when bent.

In embodiments the light engines 110 include an optical receiver facility for receiving optical data and an optical modulator facility for modulating a portion of the emitted light, so that the light engines 110 communicate with each other using the transmitted light (or a portion of the visible, IR, UV or other portion of the EM spectrum). Thus, by communicating with each other, the light engines 110 can be disposed throughout a conduit 102, so that the entire conduit 102, in any shape, can be lit with a consistent level of illumination.

In embodiments, a light engine 110 can communicate ongoing data to continually update a second light engine 110, or it can send information to the second light engine 110 about what program to run among various programs stored on it. In embodiments, the data might simply be clock data, allowing each of various light engines 110 to coordinate with clock time to run programs in prearranged sequences.

Figure 7:
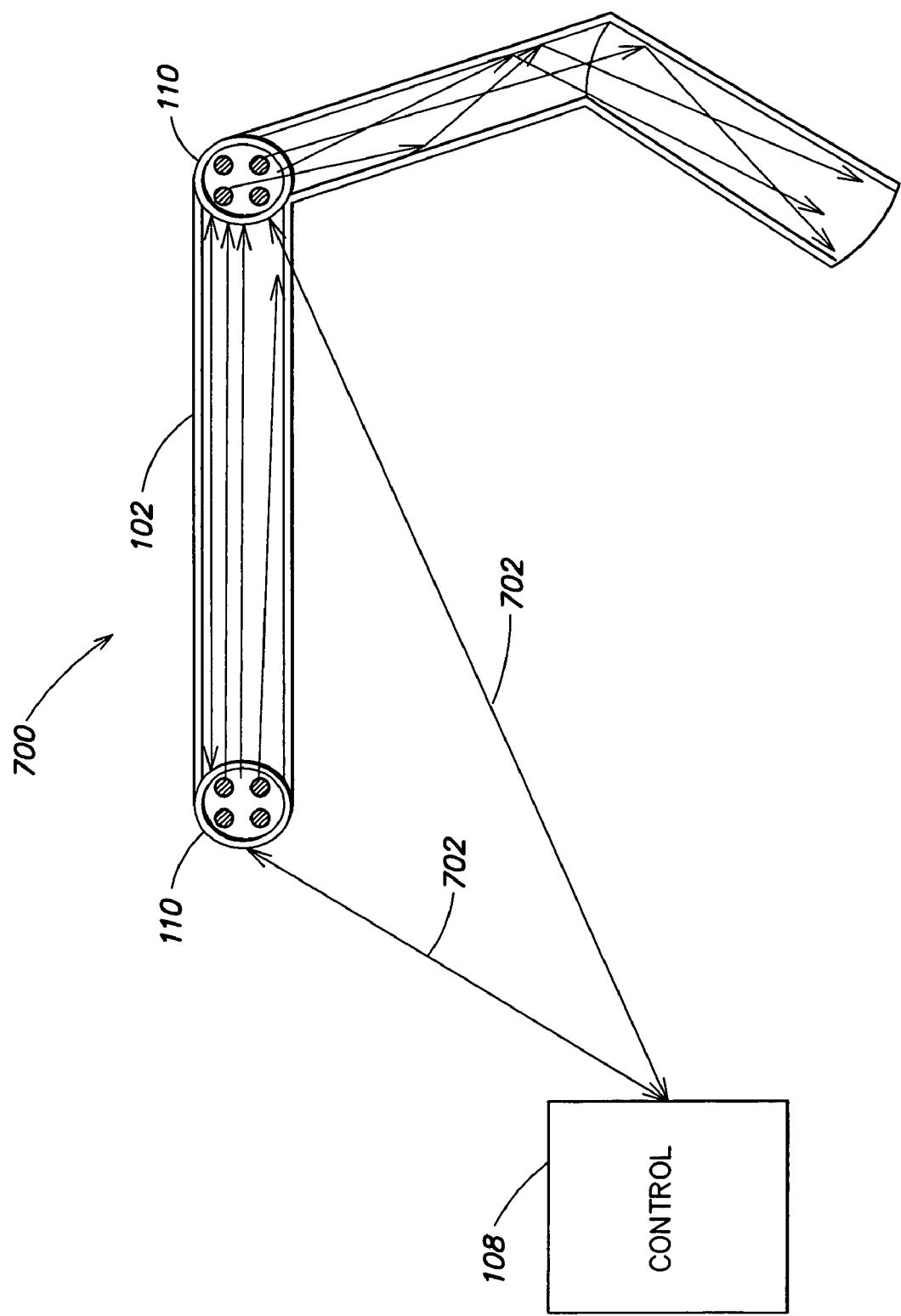
FIG. 7 depicts an embodiment of a light system with a shaped conduit.

FIG. 7 depicts an embodiment of a light system 700 with a shaped conduit 102. The conduit 102 (like others described throughout) can include an internal material, such as a fluid, liquid, gas, reflective coating, or the like, so that light from a light engine 110 is reflected or refracted inside the conduit 102 to provide diffuse illumination of the conduit 102. The light engines 110 can communicate with each other as described in connection with FIG. 6 or each one can interface 702 with the control system 108, giving the user complete control of each light engine 110 to produce whatever effect the user desires when illuminating the conduit 102.

Figure 8:
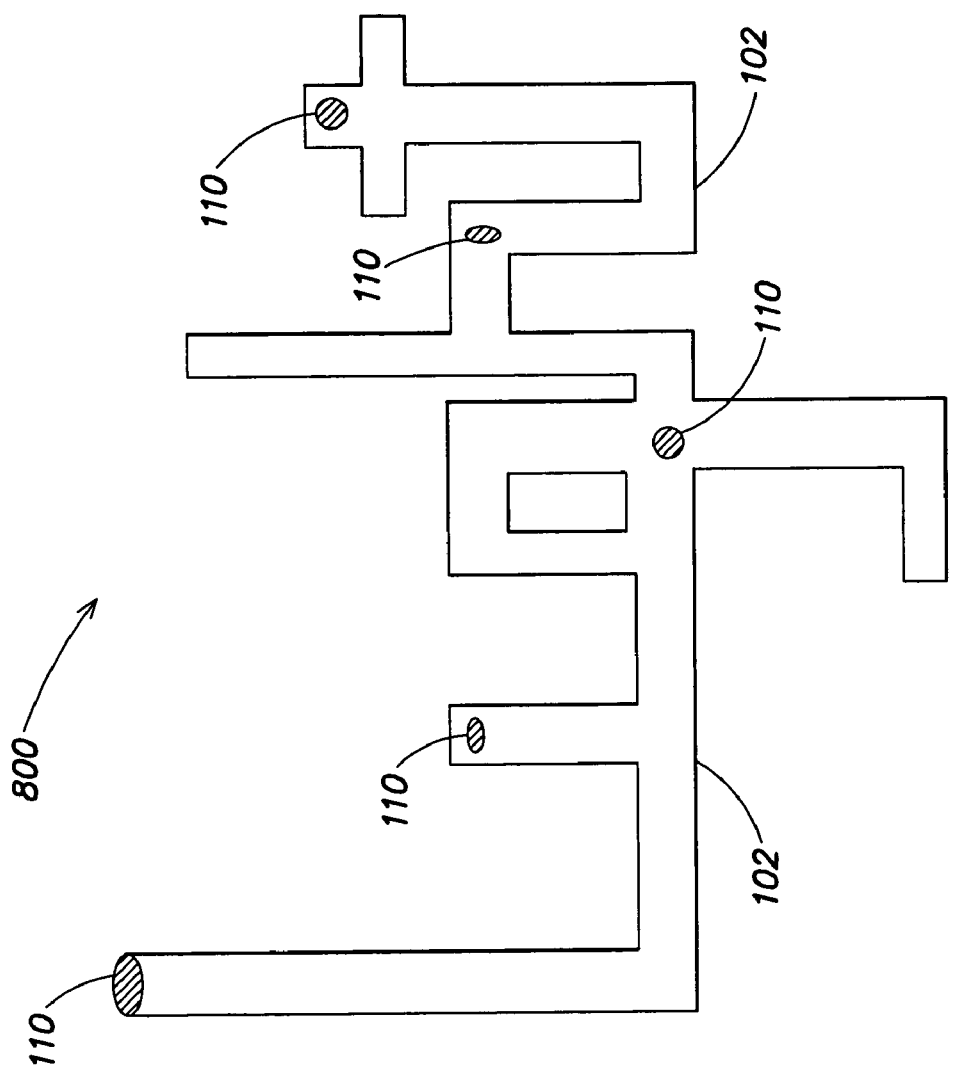
FIG. 8 depicts a light system with a conduit configured to form a sign with lettering.

FIG. 8 depicts a light system with a conduit 102 configured to form a sign 800 with lettering. Various light engines 110 disposed throughout generate light to illuminate portions of the conduit 102 or the entire conduit 102. The light engines 110 can be controlled by a controller 108 or control system 408 (not shown). By configuring a flexible conduit (or joining conduit elements 500) a user can thus create a sign 800, logo or other display or object that glows with colored light selected by the user, including a uniform color, different colors, moving colors, or colors that change with time. Any color (including white) can be provided at any time by controlling the light engines 110. A sign 800 can thus be provided which offers all of the capabilities of neon signs (attractive colored light shaped in a user-selected form) without the many drawbacks of neon (cost, inflexibility, risk of broken gas, leaking, and the like).

Figure 9:
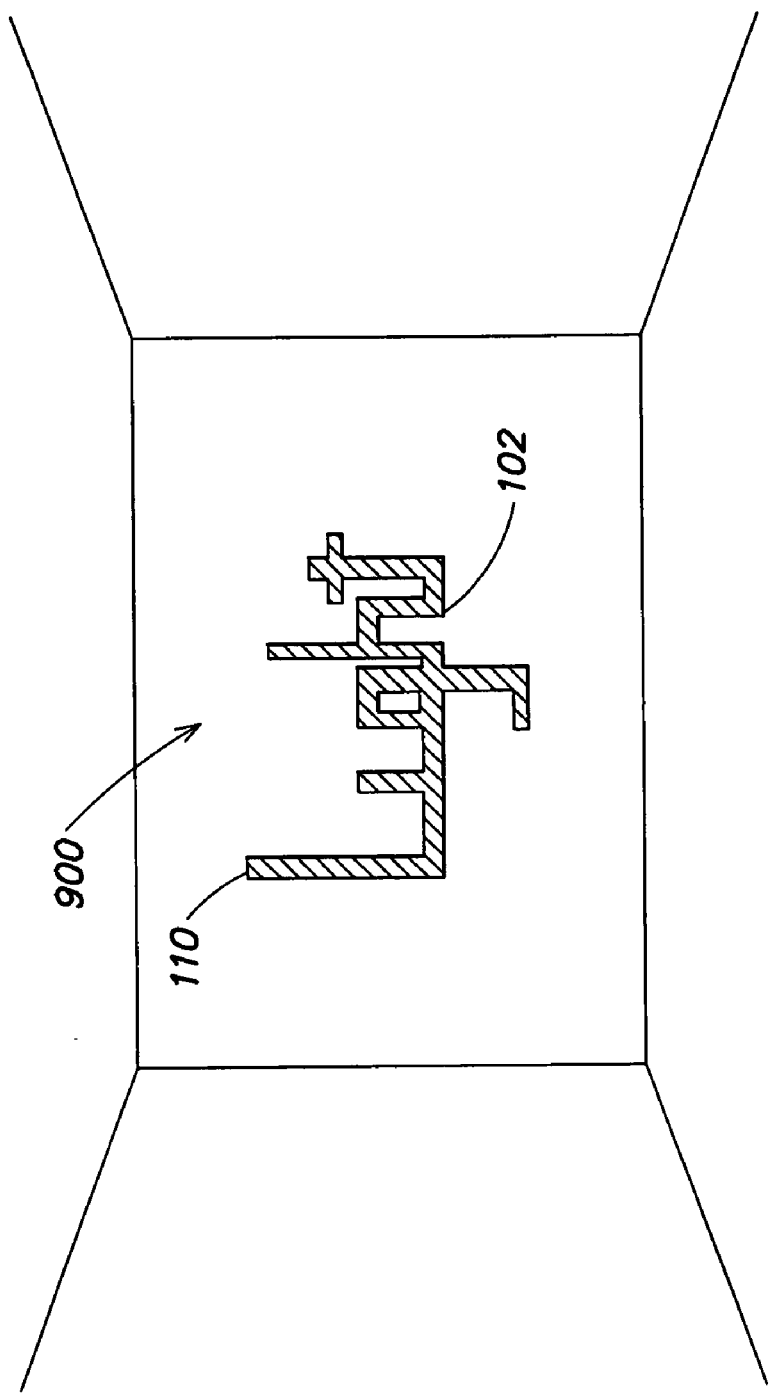
FIG. 9 depicts an interior environment with a sign formed of a light system with a shaped conduit.

FIG. 9 depicts an interior environment with a sign formed of a light system 900 with a shaped conduit 102.

Figure 10:
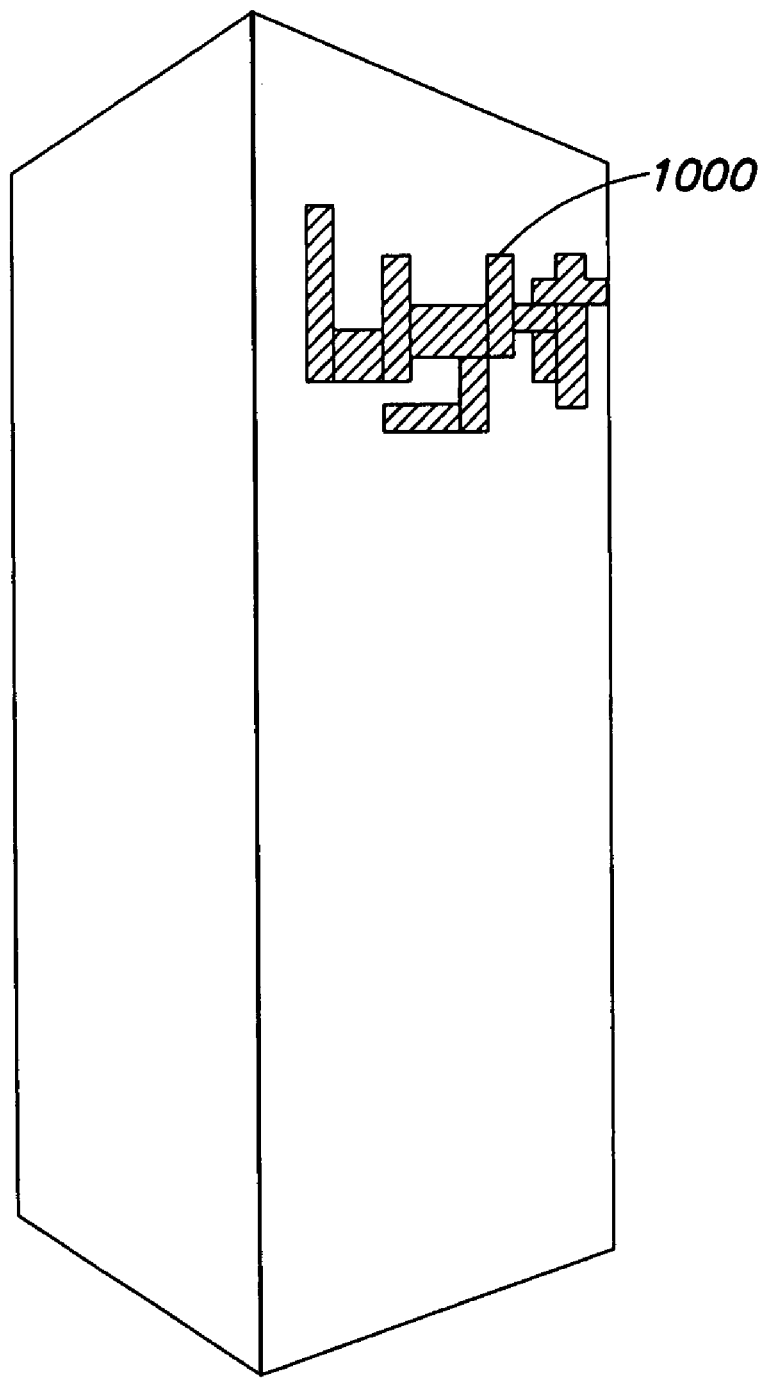
FIG. 10 depicts an exterior environment with a sign formed of a light system with a shaped conduit.

FIG. 10 depicts an exterior environment with a sign formed of a light system 1000 with a shaped conduit. Use of flexible plastics or similar materials makes light systems 1000 that include conduits 102 with light engines 110 very suitable for outdoor environments. By bending elements 500 of the conduit 102, the user can change the sign 1000. The elements 500 of the conduit 102 may include a semi-rigid element 602 for holding the elements in place, or the elements may be held in place by various fasteners, such as bolts, screws, plastic standoff facilities, or the like.

Figure 11:
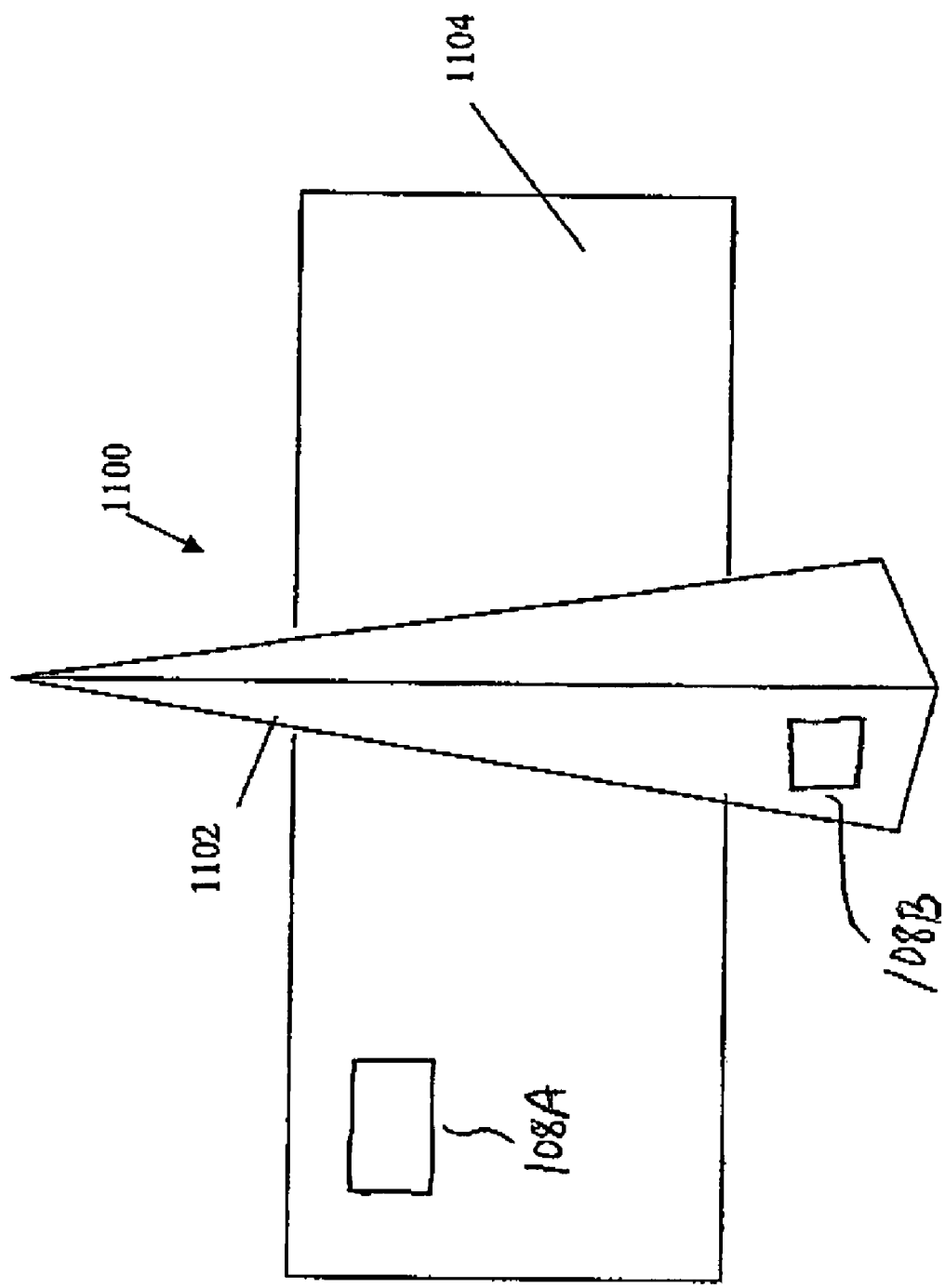
FIG. 11 depicts a light system with multiple elements, each of which is controlled by a control system.

FIG. 11 depicts a light system 1100 with multiple elements, each of which is controlled by a control system. The light system 1100 includes a first element 1102, which consists of an object or surface lit by color-changing illumination, such as by a light engine 110 or system 400 described above (including a first controller 108A), as well as a second element 1104, which is similarly controlled (i.e., including a second controller 108B). In embodiments, the first element 1102 is placed in viewing proximity to the second element 1104 to produce illumination effects that represent the combination of the two elements 1102, 1104. For example, the element 1102 can be controlled to illuminate in colors that are the same as those of the element 1104, that are complementary to those of the element 1104, that contrast with the color of the element 1104, or that follow the colors of the element 1104 in time. In an embodiment, the colors of the two elements 1102 and 1104 are controlled to be generated in complementary color pairs, such as red/green, blue/orange, and yellow/purple. Many attractive effects can be created through coordinated layering of different color controlled illuminated objects, suitces or the like. While FIG. 11 shows a two-element system, it should be understood that many-layered systems where the elements are in proximity to each other can be encompassed herein.

Figure 12:
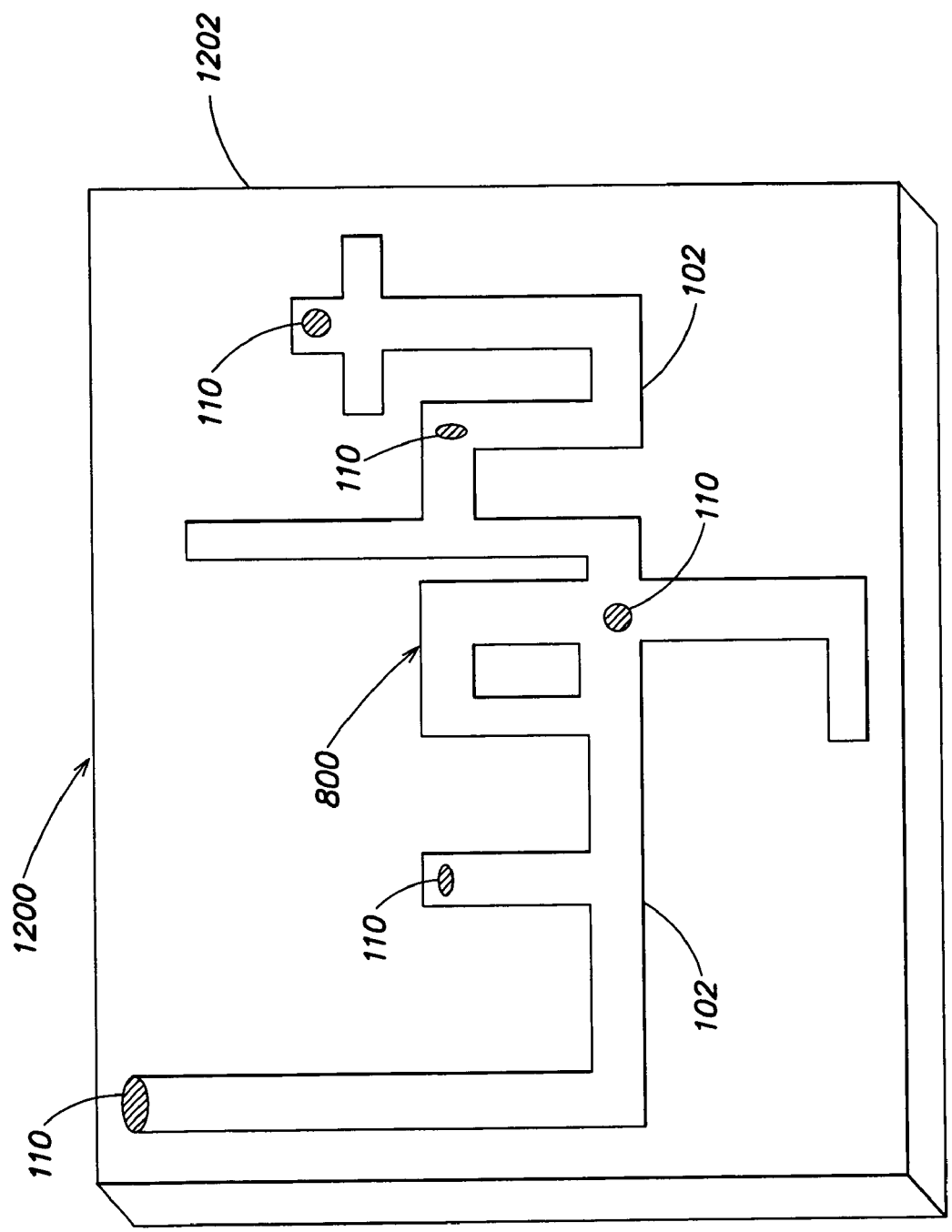
FIG. 12 depicts a light system with multiple elements, including elements formed of a conduit and elements formed of a lit background.

FIG. 12 depicts a light system 1200 with multiple elements, including elements formed of a conduit 102 and elements formed of a lit background 1202. The lit background 1202 can be a back-lit display, or a translucent material that is edge-lit, such as by a linear array of lights 104. As with FIG. 11, the conduit 102 can be a sign, and the sign can be lit in coordination with the lighting of the display 1202.

FIG. 13 depicts a light system 1300 in which a light engine 110 in a substantially linear configuration 202 (which could be curvilinear and/or flexible in embodiments) lights the edge of an optical facility 1302. The optical facility 1302 may be a conduit 102, such as described above, or it may be a solid having optical transmission, reflection or refraction properties. For example, the optical facility 1302 may be a substantially translucent cylinder, which sits on top of a housing 1304 that holds the light engine 110 with the linear grouping 202 of light sources. The light system 1300 may include a control facility 108, which may control the light engine 110 to light the optical facility 1302 with illumination, including with any of the illumination effects described above in connection with various embodiments of the invention, such as color-changing illumination, color-temperature-controlled illumination, color chasing rainbows and the like. The light system 1300 may optionally include, for example, a data facility, a memory, a processor, an addressable controller, a communications facility, or any of the other systems and facilities described herein. In embodiments the edge-lit optical facility 1302 can be shaped into a sign, such as being shaped to resemble a neon sign.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A light system, comprising:
  a plurality of conduits each having an at least partially transparent outer surface and each being configured to be connected together in a modular fashion to form an assembly, and
  a plurality of light engines spaced apart from each other within the assembly, wherein at least one light engine of the plurality of light engines is configured to generate light within and along a length of at least one conduit of the assembly, such that at least some of the light passes through the outer surface of the at least one conduit along the length of and around a perimeter of the at least one conduit;

wherein the light system includes at least one light source and at least one controller to control the at least one light source, such that the light has at least one controllable characteristic.

2. A system of claim 1, wherein the characteristic is selected from the group consisting of a color, an intensity, a saturation, and a color temperature of the light.

3. A system of claim 1, wherein the controller includes an interface.

4. A system of claim 1, wherein the light source comprises an LED.

5. A system of claim 1, wherein the light source comprises a plurality of LEDs of different colors.

6. A system of claim 5, wherein the light is white light produced by combining radiation generated by more than one of the plurality of LEDs, and each LED of the plurality of LEDs is selected from the group consisting of red, green, yellow, blue, amber, white, and orange LEDs.

7. A system of claim 6, wherein a color temperature of the white light is adjusted by mixing different amounts of the radiation from the more than one of the plurality of LEDs.

8. A system of claim 1, wherein the light source comprises LEDs configured such that the light from the light engine comprises different color temperatures of white light.

9. A system of claim 1, wherein the light engine operates in a white color mode at some times and in a non-white color mode at other times.

10. A system of claim 1, wherein the controller is a processor.

11. A system of claim 1, wherein the assembly is configured such that the light passes substantially unobstructed from a first inner portion of one conduit of the assembly to an adjacent inner portion of an adjacent conduit of the assembly.

12. A system of claim 1, wherein the at least one conduit of the plurality of conduits is made of an elastic material suitable for receiving and retransmitting the light.

13. A system of claim 1, wherein at least one of the plurality of conduits is a flexible conduit.

14. A system of claim 1, at least one of the plurality of conduits is transparent.

15. A system of claim 1, wherein at least one of the plurality of conduits is semi-opaque.

16. A system of claim 1, wherein at least one of the plurality of conduits is translucent.

17. A system of claim 1, wherein at least one of the plurality of conduits is reflective.

18. A system of claim 1, wherein at least one of the plurality of conduits is refractive.

19. A system of claim 1, wherein at least one of the plurality of conduits is a transparent elastic material.

20. A system of claim 1, wherein at least one of the plurality of conduits is elastomeric vinyl acetate.

21. A system of claim 1, wherein at least one of the plurality of conduits is made from a material selected from the group consisting of a polymer, polyurethane, PVC material, rubber, plastic, a metal, and an alloy.

22. A system of claim 1, wherein at least one of the plurality of conduits is made from a hybrid of a plurality of materials.

23. A system of claim 1, wherein at least one of the plurality of conduits is filled with a fluid.

24. A system of claim 23, wherein the fluid is a gas.

25. A system of claim 23, wherein the fluid is a liquid.

26. A system of claim 23, wherein the fluid is a vapor.

27. A system of claim 23, wherein the fluid transmits the light.

28. A system of claim 23, wherein the fluid refracts the light.

29. A system of claim 23, wherein the fluid contains particles that reflect the light.

30. A system of claim 23, wherein the fluid contains particles that refract the light.

31. A lighting system, comprising:

an elastomeric conduit having an at least partially transparent outer surface, a first end, and a second end; and at least one light engine having a light source and a controller and being disposed proximate to at least one of the first end and the second end of the conduit, and the at least one light engine being configured to generate light within and along a length of the conduit, such that at least some of the light passes though the outer surface along the length of and around a perimeter of the conduit;

wherein the light source comprises LEDs selected from the group consisting of red, green, blue, amber, white, orange, and UV LEDs;

wherein the light engine is an addressable light engine.

32. A system of claim 31, wherein the light source is configured in a linear configuration.

33. A system of claim 31, wherein the light source is configured as an array.

34. A system of claim 31, wherein the light source is configured in a curvilinear configuration.

35. A system of claim 31, wherein the light source includes a plurality of LEDs arranged into at least one group.

36. A system of claim 35, wherein each LED of the at least one group generates radiation having a different wavelength than each other LED of the at least one group.

37. A system of claim 35, wherein the group includes a triad of LEDs.

38. A system of claim 35, wherein the group includes a quadruplet of LEDs.

39. A system of claim 35, wherein the group includes a quintuplet of LEDs.

40. A system of claim 35, wherein the plurality of LEDs is configured to fit a lighting fixture.

41. A system of claim 40, wherein the lighting fixture is configured to resemble at least one of an incandescent fixture, a halogen fixture and a fluorescent fixture.

42. A system of claim 31, further comprising a mounting surface in proximity to the light engine.

43. A system of claim 42, wherein the conduit is attached to the mounting surface by an attachment facility.

44. A system of claim 43, wherein the attachment facility is at least one of a fastener, a screw, a clip and a bolt.

45. A system of claim 43, wherein the attachment facility is a standoff mechanism for holding the conduit a fixed distance from the mounting surface.

46. A system of claim 42, wherein the mounting surface is a surface of a sign.

47. A system of claim 31, further comprising a mounting facility for the conduit.

48. A system of claim 47, wherein the mounting facility serves as a light shield.

49. A system of claim 47, wherein the mounting facility rests on a light pipe.

50. A system of claim 49, wherein the light pipe collects the light generated by the light engine and delivers the light into the conduit.

51. A system of claim 49, wherein the light pipe guides the light into a receiving portion of the conduit, so that the conduit glows with a color of the light from the light engine.

52. A system of claim 31, wherein the light engine is configured to resemble a halogen lamp.

53. A system of claim 52, wherein the light engine is an MR-16 fixture.

54. A system of claim 52, wherein the light engine is configured to be suitable for insertion into a conventional halogen socket.

55. A system of claim 31, wherein the controller controls the light source such that a color of the light varies over time to produce a dynamic lighting effect.

56. A system of claim 31, wherein the controller includes a user interface.

57. A system of claim 31, wherein the controller includes a data facility.

58. A system of claim 31, wherein the controller includes a communication facility.

59. A system of claim 58, wherein the communication facility comprises a network.

60. A system of claim 58, wherein the communication facility comprises a wireless facility.

61. A system of claim 31, wherein the controller includes an algorithm facility.

62. A system of claim 31, wherein the controller is a general purpose computer.

63. A system of claim 31, wherein the controller is integrated with other system elements in an environment of the light engine.

64. A system of claim 63, wherein the other system elements are selected from the group consisting of a maintenance system, an entertainment system, a sound system, a navigation system, and a security system.

65. A system of claim 31, wherein the light engine includes a processor.

66. A system of claim 65, wherein the processor is selected from the group consisting of a microprocessor, a microcontroller, a circuit, an application specific integrated circuit, a microchip, a chip residing on a circuit board, a chipset, a circuit board, a programmable digital signal processor, a biological circuit, a programmable gate array, a programmable array logic device, a programmable logic device, a digital signal processor, an analog-to-digital converter, a digital-to-analog converter, discrete circuitry, passive analog components, active analog components, a resistor, a capacitor, an inductor, a transistor, an operational amplifiers, a discrete digital component, a shift register, and a latch.

67. A system of claim 31, further comprising a communication facility, wherein the communication facility comprises at least one of a wire-based facility, a wireless facility, a network, an interface card, a circuit, a router, a switch, a software interface, a wire, a cable, a connector, an IF facility, an JR facility, a serial port, a parallel port, a USB facility, a firewire facility, a copper wire, a modem, a Bluetooth facility, an 802.11 facility, a DSL modem, an antenna, a satellite communications facility, and a telecommunications facility.

68. A system of claim 31, wherein the controller is connected to the light source by a bus that provides two-way communication between the controller and the light source.

69. A system of claim 31, wherein the conduit comprises modular sub-elements that can be fitted together to form shapes.

70. A system of claim 69, wherein the sub-elements are selected from the group consisting of V-shaped elements, L-shaped elements, T-shaped elements, curved elements, and straight elements.

71. A system of claim 69, wherein the sub-elements are fitted together in combinations.

72. A system of claim 69, wherein the sub-elements are provided in a kit with the light system.

73. A system of claim 69, wherein a user can shape the sub-elements into a desired shape.

74. A system of claim 31, wherein the light system includes a plurality of light engines.

75. A system of claim 74, wherein the plurality of light engines are provided with a communication facility.

76. A system of claim 74, wherein the plurality of light engines are configured so as to generate the light in synchronous fashion.

77. A system of claim 74, wherein the plurality of light engines change colors in concert.

78. A system of claim 74, wherein the plurality of light engines communicate via a flexible facility selected from the group consisting of a flexible wire, a bus, and a cable.

79. A system of claim 78, wherein the flexible facility serves as a semi-rigid element for holding the conduit in a selected configuration.

80. A system of claim 74, further comprising a semi-rigid element.

81. A system of claim 80, wherein the semi-rigid element is made of a material selected from the group consisting of a metal, a polymer, and a plastic.

82. A system of claim 80, wherein the semi-rigid element holds shape when bent.

83. A system of claim 74, wherein light system of the plurality of light engines has an optical receiver facility for receiving optical data and an optical modulator facility for modulating a portion of the light, so that the a first light engine of the plurality of light engines communicates to at least one second light engine of the plurality of light engines.

84. A system of claim 83, wherein the first light engine communicates to the second light engine using the light.

85. A system of claim 83, wherein the first light engine communicates to the second light engine using a portion of the electromagnetic spectrum.

86. A system of claim 83, wherein the first light engine communicates ongoing data to continually update the second light engine.

87. A system of claim 83, wherein the first light engine sends instructions to the second light engine to execute a stored lighting program.

88. A system of claim 87, wherein the instructions comprise clock data, such that the second light engine can execute the stored lighting program and the first light engine can execute the same stored lighting program or an additional stored lighting program in coordination with each other and the clock data.

89. A system of claim 31, wherein the light system includes two light engines respectively disposed proximate to the first end and the second end.

90. A system of claim 31, wherein the conduit is configured to form a sign with lettering.

91. A system of claim 90, wherein the light system includes a plurality of light engines that are disposed throughout the sign to generate the light.

92. A system of claim 90, wherein the sign is configured to resemble a conventional neon sign.

93. A system of claim 31, further comprising a plurality of second light engines spaced apart from each other along the length of the conduit.

94. A lighting system, comprising:
- an elastomeric conduit having an at least partially transparent outer surface, a first end, and a second end;
- at least one light engine having a light source and a controller and being disposed proximate to at least one of the first end and the second end of the conduit, and the at least one light engine being configured to generate light within and along a length of the conduit, such that at least some of the light passes though the outer surface along the length of and around a perimeter of the conduit;
- wherein the light source comprises LEDs selected from the group consisting of red, green, blue, amber, white, orange, and UV LEDs; and
- an interface for delivering a control signal to the controller.

95. A system of claim 94, wherein the interface includes at least one of a wire, a cable, a network, a bus, a circuit, and a wireless interface.

96. A system of claim 95, wherein the interface comprises at least one of a user interface, a power-cycle-based interface, a general purpose computer interface, a keyboard, a mouse, a voice- or image-recognition interface, a programming interface, a software authoring tool interface, a light show player interface, a touchpad interface, a wireless interface, an interface for a conventional lighting system, an entertainment system interface, a communications system interface, a maintenance system interface, and a navigation system interface.

97. A lighting system, comprising:
- an elastomeric conduit having an at least partially transparent outer surface, a first end, and a second end; and
- at least one light engine having a light source and a controller and being disposed proximate to at least one of the first end and the second end of the conduit, and the at least one light engine being configured to generate light within and along a length of the conduit, such that at least some of the light passes through the outer surface along the length of and around a perimeter of the conduit;
- wherein the light source comprises LEDs selected from the group consisting of red, green, blue, amber, white, orange, and UV LEDs;
- wherein the controller includes a data facility for storing data for the light engine.

98. A system of claim 97, wherein the data facility comprises at least one of a read-only memory, a programmable read-only memory, an electronically erasable programmable read-only memory, a random access memory, a dynamic random access memory, a double data rate random access memory, a Rambus direct random access memory, and a flash memory.

99. A system of claim 97, wherein the data facility is at least one of a general purpose computer system, a RAM, a ROM, a hard disk memory, a diskette, a zip drive, a jump drive, a database, a SQL database, a TCL database, an Oracle database, an Access database, a data facility of an entertainment system, a data facility of a maintenance system, a data facility of a safety system and a combination of more than one type of data facility.

100. A system of claim 97, wherein the data for the light engine resides in a plurality of systems.

101. A system of claim 100, wherein at least one first system of the plurality of systems is a safety system and at least one second system of the plurality of systems is an entertainment system.

102. A system of claim 100, wherein at least first system of the plurality of systems is a lighting controller and at least one second system of the plurality of systems is an entertainment system.

103. A lighting system comprising:
- at least one conduit lit by a firt color-changing illumination from a first light engine having a first controller and at least on first LED; and
- at least one element lit by a second color-changing illumination from a second light engine having a second controller and at least one second LED;
- wherein the at least one conduit is placed in viewing proximity to the at least one element so as to produce coordinated layered illumination effects that represent the combination of the at least one conduit and the least one element.

104. A system of claim 103, wherein a first color of the first color-changing illumination is the same as a second color of the second color-changing illumination.

105. A system of claim 103, wherein a first color of the first color-changing illumination is complementary to a second color of the second color-changing illumination.

106. A system of claim 105, wherein the first and second colors are generated in complimentary color pairs.

107. A system of claim 106, wherein the complimentary color pairs are selected from the group consisting of a red/greem pair, a blue/orange pair, and a yellow/purple pair.

108. A system of claim 103, wherein the element comprises a lit background.

109. A system of claim 108, wherein the lit background is edge-lit by a linear array of light engines including the second light engine.

110. A system of claim 108, wherein the conduit is a sign, and the sign is lit in coordination with the lit background.

111. A method of lighting an assembly comprised of a plurality of conduits each having an at least partially transparent outer surface and each being configured to be connected together in a modular fashion to form the assembly, the method comprising:
- generating light by a plurality of light engines spaced apart from each other within the assembly so that the generated light travels within and along a length of at least one conduit of the assembly; and
- passing at least some of the generated light from light system of the plurality of light engines though the outer surface of the at least one conduit along the length of and around a perimeter of the at least one conduit;
- wherein the light system includes at least one light source and at least one controller to control the at least one light source, such that the generated light has at least one controllable characteristic.

112. A method of claim 111, wherein the characteristic is selected from the group consisting of a color, an intensity, a saturation, and a color temperature of the light.

113. A method of claim 111, wherein the controller includes an interface.

114. A method of claim 111, wherein the light source comprises at least one LED.

115. A method of claim 111, wherein the light source comprises a plurality of LEDs of different colors.

116. A method of claim 115, wherein the generated light is white light produced by combining radiation generated by more than one of the plurality of LEDs, and each LED of the plurality of LEDs is selected from the group consisting of red, green, yellow, blue, amber, white, and orange LEDs.

117. A method of claim 111, wherein the light source comprises LEDs configured such that the generated light from the light engine comprises different color temperatures of white light.

118. A method of claim 117, wherein the a color temperature of the white light is adjusted by mixing different amounts of the radiation from the more than one of the plurality of LEDs.

119. A method of claim 111, wherein the light engine operates in a white color mode at some times and in a non-white color mode at other times.

120. A method of claim 111, wherein the controller is a processor.

121. A method of claim 111, wherein the assembly is configured such that the generated light passes substantially unobstructed from a first inner portion of one conduit of the assembly to an adjacent inner portion of an adjacent conduit of the assembly.

122. A method of claim 111, wherein at least one conduit of the plurality of conduits is made of an elastic material suitable for receiving and retransmitting the light.

123. A method of claim 111, wherein at least one of the plurality of conduits is a flexible conduit.

124. A method of claim 111, wherein at least one of the plurality of conduits is transparent.

125. A method of claim 111, wherein at least one of the plurality of conduits is semi-opaque.

126. A method of claim 111, wherein at least one of the plurality of conduits is translucent.

127. A method of claim 111, wherein at least one of the plurality of conduits is reflective.

128. A method of claim 111, wherein at least one of the plurality of conduits is refractive.

129. A method of claim 111, wherein at least one of the plurality of conduits is a transparent elastic material.

130. A method of claim 111, wherein at least one of the plurality of conduits is elastomeric vinyl acetate.

131. A method of claim 111, wherein at least one of the plurality of conduits is made from a material selected from the group consisting of a polymer, polyurethane, PVC material, rubber, plastic, a metal, and an alloy.

132. A method of claim 111, wherein at least one of the plurality of conduits is made from a hybrid of a plurality of materials.

133. A method of claim 111, wherein at least one of the plurality of conduits is filled with a fluid.

134. A method of claim 133, wherein the fluid is a gas.

135. A method of claim 133, wherein the fluid is a liquid.

136. A method of claim 133, wherein the fluid is a vapor.

137. A method of claim 133, wherein the fluid transmits the generated light.

138. A method of claim 133, wherein the fluid refracts the generated light.

139. A method of claim 133, wherein the fluid contains particles that reflect the generated light.

140. A method of claim 133, wherein the fluid contains particles that refract the generated light.

141. A method of lighting an elastomeric conduit having an at least partially transparent outer surface, a first end, and a second end, the method comprising:
 generating light by light system having a controller and a light source and being disposed proximate to at least one of the first end and the second end of the conduit,
 wherein the light system is configured such that the generated light travels within and along a length of the conduit; and
 passing at least some of the generated light through the outer surface of the conduit along the length of and around a perimeter of the conduit;
 wherein the light source comprises LEDs selected from the group consisting of red, green, blue, amber, white, orange, and UV LEDs;
 wherein the light engine is an addressable light engine.

142. A method of claim 141, wherein the light source is configured in a linear configuration.

143. A method of claim 141, wherein the light source is configured as an array.

144. A method of claim 141, wherein the light source is configured in a curvilinear configuration.

145. A method of claim 141, wherein the light source includes a plurality of LEDs arranged into at least one group.

146. A method of claim 145, wherein each LED of the at least one group generates radiation having a different wavelength than each other LED of the at least one group.

147. A method of claim 145, wherein the group includes a triad of LEDs.

148. A method of claim 145, wherein the group includes a quadruplet of LEDs.

149. A method of claim 145, wherein the group includes a quintuplet of LEDs.

150. A method of claim 145, wherein the group includes a sextuplet of LEDs.

151. A method of claim 145, wherein the plurality of LEDs is configured to fit a lighting fixture.

152. A method of claim 151, wherein the lighting fixture is configured to resemble at least one of an incandescent fixture, a halogen fixture and a fluorescent fixture.

153. A method of claim 145, wherein the conduit is attached to a mounting surface in proximity to the light engine.

154. A method of claim 153, wherein the conduit is attached to the mounting surface by an attachment facility.

155. A method of claim 154, wherein the attachment facility is at least one of a fastener, a screw, a clip and a bolt.

156. A method of claim 154, wherein the attachment facility is a standoff mechanism for holding the conduit a fixed distance from the mounting surface.

157. A method of claim 153, wherein the mounting surface is a surface of a sign.

158. A method of claim 145, wherein the conduit is mounted on a mounting facility.

159. A method of claim 158, wherein the mounting facility serves as a light shield.

160. A method of claim 158, wherein the mounting facility rests on a light pipe.

161. A method of claim 160, wherein the light pipe collects the generated light and delivers the generated light into the conduit.

162. A method of claim 161, wherein the light pipe guides the generated light into a receiving portion of the conduit, so that the conduit glows with a color of the generated light.

163. A method of claim 145, wherein the light engine is configured to resemble a halogen lamp.

164. A method of claim 163, wherein the light engine is an MR-16 fixture.

165. A method of claim 163, wherein the light engine is configured to be suitable for insertion into a conventional halogen socket.

166. A method of claim 145, wherein the controller controls the light source such that a color of the light varies over time to produce a dynamic lighting effect.

167. A method of claim 166, wherein the controller includes a user interface.

168. A method of claim 166, wherein the controller includes a data facility.

169. A method of claim 166, wherein the controller includes a communication facility.

170. A method of claim 169, wherein the communication facility comprises a network.

171. A method of claim 169, wherein the communication facility comprises a wireless facility.

172. A method of claim 169, wherein the communication facility comprises at least one of a wire-based facility, a wireless facility, a network, an interface card, a circuit, a router, a switch, a software interface, a wire, a cable, a connector, an RF facility, an IR facility, a serial port, a parallel port, a USB facility, a firewire facility, a copper wire, a modem, a Bluetooth facility, an 802.11 facility, a DSL modem, an antenna, a satellite communications facility, and a telecommunications facility.

173. A method of claim 166, wherein the controller includes an algorithm facility.

174. A method of claim 166, wherein the controller is a general purpose computer.

175. A method of claim 166, wherein the controller is integrated with other system elements in an environment of the light engine.

176. A method of claim 175, wherein the other system elements are selected from the group consisting of a maintenance system, an entertainment system, a sound system, a navigation system, and a security system.

177. A method of claim 166, wherein the controller includes a data facility for storing data for the light engine.

178. A method of claim 177, wherein the data facility comprises at least one of a read-only memory, a programmable read-only memory, an electronically erasable programmable read-only memory, a random access memory, a dynamic random access memory, a double data rate random access memory, a Rambus direct random access memory, and a flash memory.

179. A method of claim 177, wherein the data facility is at least one of a general purpose computer system, a RAM, a ROM, a hard disk memory, a diskette, a zip drive, a jump drive, a database, a SQL database, a TCL database, an Oracle database, an Access database, a data facility of an entertainment system, a data facility of a maintenance system, a data facility of a safety system and a combination of more than one type of data facility.

180. A method of claim 177, wherein the data for the light engine resides in a plurality of systems.

181. A method of claim 180, wherein at least one first system of the plurality of systems is a safety system and at least one second system of the plurality of systems is an entertainment system.

182. A method of claim 180, wherein at least one first system of the plurality of systems is a lighting controller and at least one second system of the plurality of systems is an entertainment system.

183. A method of claim 166, wherein the controller is connected to the light source by a bus that provides two-way communication between the controller and the light source.

184. A method of claim 145, wherein the light engine includes a processor.

185. A method of claim 184, wherein the processor is selected from the group consisting of a microprocessor, a microcontroller, a circuit, an application specific integrated circuit, a microchip, a chip residing on a circuit board, a chipset, a circuit board, a programmable digital signal processor, a biological circuit, a programmable gate array, a programmable array logic device, a programmable logic device, a digital signal processor, an analog-to-digital converter, a digital-to-analog converter, discrete circuitry, passive analog components, active analog components, a resistor, a capacitor, an inductor, a transistor, an operational amplifiers, a discrete digital component, a shift register, and a latch.

186. A method of claim 145, wherein the conduit comprises modular sub-elements that can be fitted together to form shapes.

187. A method of claim 145, wherein the sub-elements are selected from the group consisting of V-shaped elements, L-shaped elements, T-shaped elements, curved elements, and straight elements.

188. A method of claim 145, wherein the sub-elements are fitted together in combinations.

189. A method of claim 145, wherein the sub-elements are provided in a kit with the light system.

190. A method of claim 145, wherein a user can shape the sub-elements into a desired shape.

191. A method of claim 145, wherein the light system includes a plurality of light engines.

192. A method of claim 191, wherein the plurality of light engines are provided with a communication facility.

193. A method of claim 191, wherein the plurality of light engines are configured so as to generate the generated light in synchronous fashion.

194. A method of claim 191, wherein the plurality of light engines change colors in concert.

195. A method of claim 191, wherein the plurality of light engines communicate via a flexible facility selected from the group consisting of a flexible wire, a bus, and a cable.

196. A method of claim 195, wherein the flexible facility serves as a semi-rigid element for holding the conduit in a selected configuration.

197. A method of claim 191, wherein light system of the plurality of light engines has an optical receiver facility for receiving optical data and an optical modulator facility for modulating a portion of the generated light, so that a first light engine of the plurality of light engines communicates to at least one second light engine of the plurality of light engines.

198. A method of claim 197, wherein the first light engine communicates to the second light engine using the generated light.

199. A method of claim 191, wherein the first light engine communicates to the second light engine using a portion of the electromagnetic spectrum.

200. A method of claim 191, wherein the first light engine communicates ongoing data to continually update the second light engine.

201. A method of claim 191, wherein the first light engine sends instructions to the second light engine to execute a stored lighting program.

202. A method of claim 201, wherein the instructions comprise clock data, such that the second light engine can execute the stored lighting program and the first light engine can execute the same stored lighting program or an additional stored lighting program in coordination with each other and the clock data.

203. A method of claim 145, wherein the conduit includes a semi-rigid element.

204. A method of claim 203, wherein the semi-rigid element is made of a material selected from the group consisting of a metal, a polymer, and a plastic.

205. A method of claim 203, wherein the semi-rigid element holds shape when bent.

206. A method of claim 145, wherein the conduit is configured to form a sign with lettering.

207. A method of claim 206, wherein the at least one light engine includes a plurality of light engines that are disposed throughout the sign to generate the generated light.

208. A method of claim 206, wherein the sign is configured to resemble a conventional neon sign.

209. A method of claim 141, wherein the at least one light engine includes two light engines respectively disposed proximate to the first end and the second end.

210. A method of claim 141, wherein light engines from a plurality of second light engines are spaced apart from each other along the length of the conduit.

211. A method of lighting an elastomeric conduit having an at least partially transparent outer surface, a first end, and a second end, the method comprising:
generating light by at least one light engine having a controller and a light source and being disposed proximate to at least one of the first end and the second end of the conduit, wherein the at least one light engine is configured such that the generated light travels within and along a length of the conduit; and
passing at least some of the generated light through the outer surface of the conduit along the length of and around a perimeter of the conduit;
wherein the light source comprises LEDs selected from the group consisting of red, green, blue, amber, white, orange, and UV LEDs; and
using an interface to deliver a control signal to the controller.

212. A method of claim 211, wherein the interface includes at least one of a wire, a cable, a network, a bus, a circuit, and a wireless interface.

213. A method of claim 211, wherein the interface comprises at least one of a user interface, a power-cycle-based interface, a general purpose computer interface, a keyboard, a mouse, a voice- or image-recognition interface, a programming interface, a software authoring tool interface, a light show player interface, a touchpad interface, a wireless interface, an interface for a conventional lighting system, an entertainment system interface, a communications system interface, a maintenance system interface, and a navigation system interface.

214. A method of lighting a system, the method comprising:
lighting at least one conduit by a first color-changing illumination from a first light engine having a first controller and at least one first LED; and
lighting at least one element by a second color-changing illumination from a second light engine having a second controller and at least one second LED, wherein the at least one conduit is placed in viewing proximity to at least one element so as to produce coordinated layered illumination effects that represent the combination of the at least one conduit and the at least one element.

215. A method of claim 214, wherein a first color of the first color-changing illumination is the same as a second color of the second color-changing illumination.

216. A method of claim 214, wherein a first color of the first color-changing illumination is complementary to a second color of the second color-changing illumination.

217. A method of claim 216, wherein the first and second colors are generated in complementary color pairs.

218. A method of claim 217, wherein the complementary color pairs are selected from the group consisting of a red/green pair, a blue/orange pair, and a yellow/purple pair.

219. A method of claim 214, wherein the at least one element comprises a lit background.

220. A method of claim 219, wherein the lit background is edge-lit by a linear array of light engines including the second light engine.

221. A method of claim 219, wherein the conduit is a sign, and the sign is lit in coordination with the lit background.

* * * * *

UNITED STATES PATENT AND TRADEMARK OFFICE
CERTIFICATE OF CORRECTION

PATENT NO.         : 7,300,192 B2
APPLICATION NO.    : 10/678971
DATED              : November 27, 2007
INVENTOR(S)        : George G. Mueller et al.

It is certified that error appears in the above-identified patent and that said Letters Patent is hereby corrected as shown below:

Title Page, Item (56)
On page 4, FOREIGN PATENT DOCUMENTS,
　　　　"DE 28620583" should read -- DE 29620583 --

In the Claims:

Col. 19 in Claim 1, line 7, "wherein the light system includes" should read
　　-- wherein the at least one light engine includes --

Col. 20 in Claim 31, line 22, "light passes though" should read -- light passes through --

Col. 21 in Claim 67, lines 59-60, "an IF facility, an JR facility" should read
　　-- an RF facility, an IR facility --

Col. 22 in Claim 72, line 11, "kit with the light system." should read -- kit with the at least one light engine. --

Col. 22 in Claim 74, line 14, "the light system" should read -- the lighting system --

Col. 22 in Claim 83, lines 37-38, "wherein light system of the plurality" should read -- wherein at least one light engine of the plurality --

Col. 22 in Claim 89, line 60, "the light system" should read -- the lighting system --

Col. 22 in Claim 91, line 65, "the light system" should read -- the lighting system --

Col. 23 in Claim 94, line 14, "light passes though" should read -- light passes through --

Col. 23 in Claim 103:

line 10, "lit by a firt" should read -- lit by a first -- line 12, "at least on" should read -- at least one -- line 19, "and the least" should read -- and the at least --

UNITED STATES PATENT AND TRADEMARK OFFICE
CERTIFICATE OF CORRECTION

| | |
|---|---|
| PATENT NO. | : 7,300,192 B2 |
| APPLICATION NO. | : 10/678971 |
| DATED | : November 27, 2007 |
| INVENTOR(S) | : George G. Mueller et al. |

It is certified that error appears in the above-identified patent and that said Letters Patent is hereby corrected as shown below:

Col. 24 in Claim 106, line 28, "complimentary" should read -- complementary --

Col. 24 in Claim 107:

line 29, "complimentary" should read -- complementary -- line 31, "red/greem" should read -- red/green --

Col. 24 in Claim 111:

lines 48-49, "from light system of the plurality of light engines though the outer surface" should read -- from at least one light engine of the plurality of light engines through the outer surface -- line 52, "wherein the light system includes" should read -- wherein the at least one light engine includes --

Col. 25 in Claim 141, line 65, "generating light by light system having a controller" should read -- generating light by at least one light engine having a controller --

Col. 26 in Claim 141, line 1, "wherein the light system is configured" should read -- wherein the at least one light engine is configured --

Col. 28 in Claim 189, line 22, "kit with the light system." should read -- kit with the at least one light engine. --

UNITED STATES PATENT AND TRADEMARK OFFICE
CERTIFICATE OF CORRECTION

PATENT NO. : 7,300,192 B2
APPLICATION NO. : 10/678971
DATED : November 27, 2007
INVENTOR(S) : George G. Mueller et al.

It is certified that error appears in the above-identified patent and that said Letters Patent is hereby corrected as shown below:

Col. 28 in Claim 191, line 25, "wherein the light system includes" should read -- wherein the at least one light engine includes --

Col. 28 in Claim 197, line 40, "wherein light system of the plurality" should read -- wherein at least one light engine of the plurality --

Col. 30 in Claim 214, line 17, "proximity to at least one" should read -- proximity to the at least one --

Signed and Sealed this

Eighth Day of July, 2008

JON W. DUDAS
*Director of the United States Patent and Trademark Office*